United States Patent
Santo, Jr.

(10) Patent No.: US 10,572,852 B2
(45) Date of Patent: Feb. 25, 2020

(54) SOFTWARE APPLICATION FOR THE AUTOMATED DROP-OFF AND PICK-UP OF A SERVICE ITEM AT A SERVICE FACILITY

(71) Applicant: Louis A. Santo, Jr., Dillsburg, PA (US)

(72) Inventor: Louis A. Santo, Jr., Dillsburg, PA (US)

( * ) Notice: Subject to any disclaimer, the term of this patent is extended or adjusted under 35 U.S.C. 154(b) by 689 days.

(21) Appl. No.: 14/713,953

(22) Filed: May 15, 2015

(65) Prior Publication Data

US 2015/0262119 A1 Sep. 17, 2015

Related U.S. Application Data

(63) Continuation-in-part of application No. 12/649,457, filed on Dec. 30, 2009, now abandoned.

(51) Int. Cl.
  *G06Q 10/06* (2012.01)
  *G06Q 10/08* (2012.01)
  *G06Q 10/00* (2012.01)

(52) U.S. Cl.
  CPC .......... *G06Q 10/087* (2013.01); *G06Q 10/06* (2013.01); *G06Q 10/20* (2013.01)

(58) Field of Classification Search
  CPC ........................... G06Q 10/06; G06Q 10/087
  USPC ........................................................ 705/40
  See application file for complete search history.

(56) References Cited

U.S. PATENT DOCUMENTS

| 8,768,565 B2 * | 7/2014 | Jefferies | G07B 15/00 701/29.6 |
| 2004/0059618 A1 * | 3/2004 | Ford | G06Q 10/10 705/305 |
| 2009/0302105 A1 * | 12/2009 | Cassady | D06F 95/00 235/381 |

\* cited by examiner

*Primary Examiner* — Jessica Lemieux
(74) *Attorney, Agent, or Firm* — Z IP Law PLLC

(57) ABSTRACT

A software application system for the automated drop-off and pick-up for repair, return or exchange of service items including a secure drop-off/pick-up area for the items, a software application that is integrated with a stat system server of a service provider, the software application creating a unique identifier for secure access and retrieval of a service item and the software application having a notification interface to facilitate automated notification for responsive communication between the user and the service provider to describe service or repair required, provide quotations, request and receive additional information and notify the customer on completion of the service and scheduled maintenance using automated voicemail recording, and/or text messaging through a cellular telephone, email, PDA or iPhone using a web-based or mobile based applet.

11 Claims, 18 Drawing Sheets

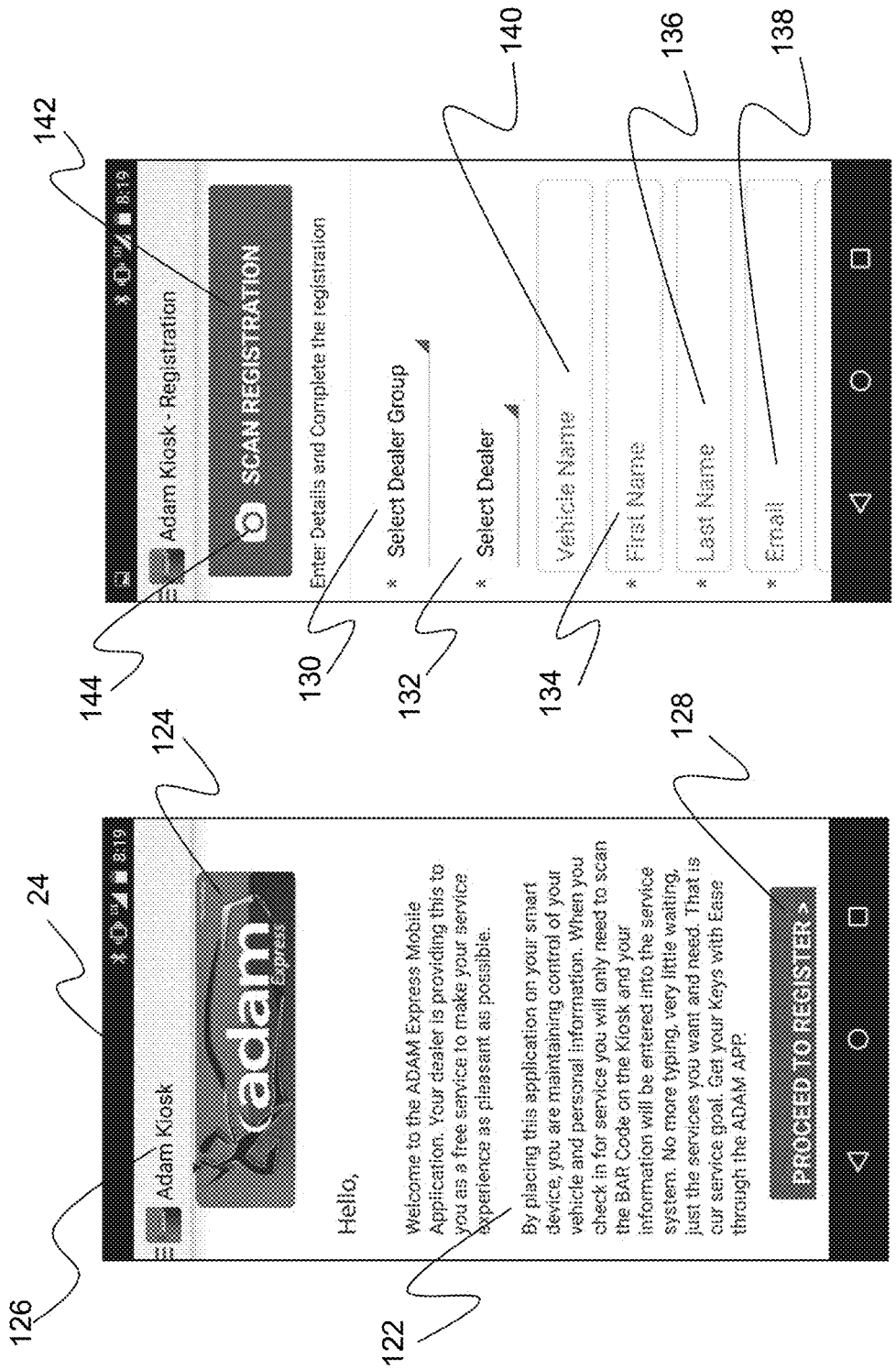

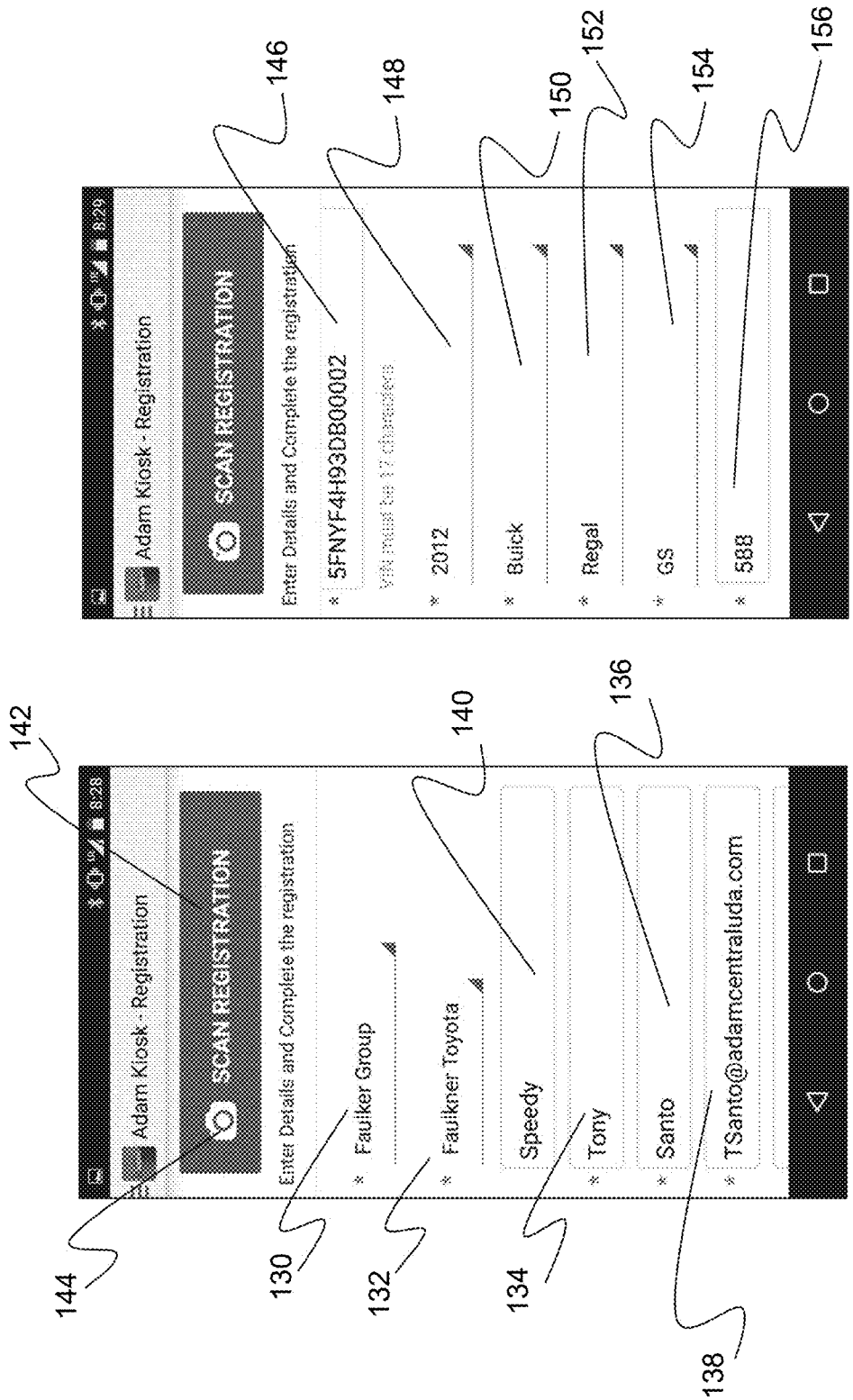

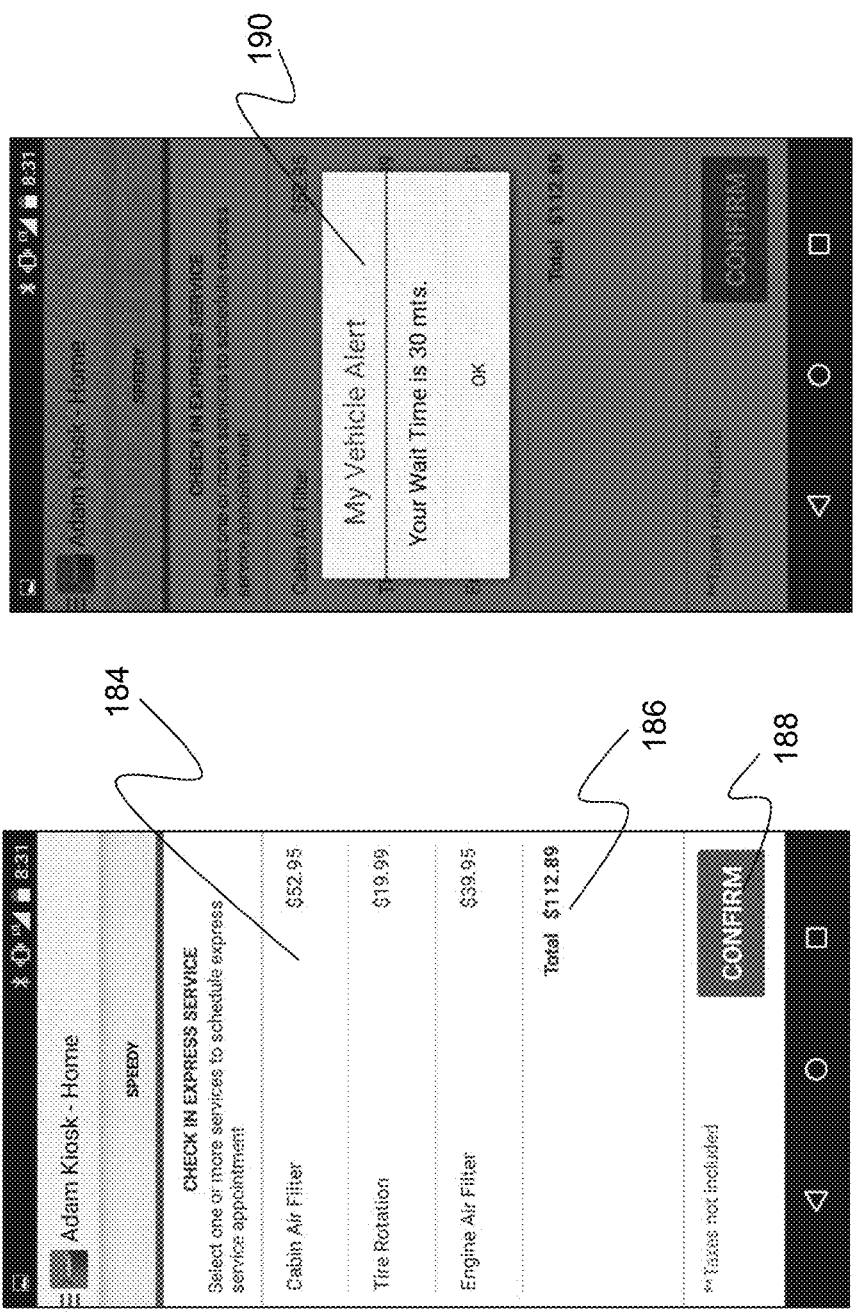

FIG. 21

SOFTWARE APPLICATION FOR THE AUTOMATED DROP-OFF AND PICK-UP OF A SERVICE ITEM AT A SERVICE FACILITY

RELATED APPLICATIONS

This application is a continuation-in-part of U.S. patent application Ser. No. 12/649,457 filed Dec. 30, 2009 entitled AUTOMATED DROP-OFF ASSISTANCE SYSTEM AND METHOD which is incorporated herein by reference in its entirety.

FIELD OF THE INVENTION

The present invention provides an innovative software system solution to automate the drop-off and pick-up of a vehicle or other service item for repair, return and exchange. This express mobile software application system includes a secure drop-off/pick-up goods exchange area for the service items and the express mobile software application that is integrated with a data system server of the service provider. The express mobile software application system is implemented on a computer system network using a microprocessors, memory, and data storage to manage, transform, transmit and store data and present and collect information through an easy to understand user interface. The express mobile software application system further facilitates the automated notification for responsive communication between the user and the service provider to describe service or repair required, provide cost quotations and present work orders as well as notify the customer on completion of the service using automated voicemail recording, and/or text messaging through a mobile digital device such as a cellular telephone, email, PDA or iPhone, smartphone, laptop, tablet, or other computer system, using a web based applet and/or mobile software application. The software application system further securely stores information related to the customer who may be the owner or the user of a vehicle and verifies the identification of the customer through the implementation of a unique encoded identifier to speed up the process of picking up and dropping-off a vehicle, without requiring interaction by the customer with service personnel.

BACKGROUND OF THE INVENTION

The traditional method of dealing with a service related business has been to interact with the employees during the company's business hours to complete the service transaction. This interaction can be tedious and can result in the customer having to be inconvenienced by the company's specific operating hours, possibly having to wait to be helped, wait while repair is completed or be delayed because a knowledgeable enough employee is not immediately available during the service transaction. It can be especially inconvenient when the service simply requires its customer to drop-off or pick-up the items to be repaired, returned, or exchanged and the nature of the service to be effectively communicated. By removing the face to face encounter of the customer and employee from the service side of these routine service drop-offs and pick-ups, and instead providing an automated notification communication link between the customer and service provider, the customer can save time and can more accurately communicate information on the service required and the service provider can save time and money.

The use of a communication line for a customer at the point of drop-off of an item for a service transaction is known in the prior art such as in Lohrey et al. U.S. Pat. No. 4,803,348 that describes a system for automating laundry or dry cleaning services. In this disclosure a telephone system was available at the time of drop-off of the clothing items in order to discuss problems, complaints and special requests; however this approach may require a person to be available to receive the telephone calls or if a message is recorded during non-business hours there may be a longer delay before receipt of the message by the service provider and there is no confirmation from the service provider that the message was received. The Lohrey et al. patent also fails to disclose any further communication for additional information or notification to the customer at the completion of the services.

OBJECTS AND SUMMARY OF THE INVENTION

The present invention provides an innovative software application system that securely stores and identifies the customer who may be the owner or the user to automate the picking up and dropping-off of the customer's vehicle or other service item for retail services, such as repair services (e.g. for automobiles, electronic devices and other various machinery), rental services (e.g. for cars, video/audio media and other various equipment), cleaning services (e.g. for laundry, dry cleaning and cars), and return services (e.g. for clothing and other various goods). The express mobile software application system of the present invention includes a simplified method for completing the drop-off transaction by providing an easy to use accessible user interface that provides one or more methods to initiate the transaction, establish a contact platform for an automated notification system for communication between the customer and service provider on the service to be or that has been performed, provide a secure and direct means to pay for the transaction, and securely identify the customer and pick-up the vehicle or other service item. A convenient, efficient and effective user interface for both the customer and the service company improves the communication and satisfaction of the customer and greatly reduces the risk of unnecessary repairs due to miscommunication between the customer and employees of the service company.

At the initiation of a transaction using the express mobile software application system to automate the picking up and dropping-off of a vehicle or other service item, the customer is provided with a user interface for the entry or selection of data into the express mobile software application data system. Using features of the express mobile software application and through the integration of the express mobile software application with the data systems of the service provider, this customer data is transformed and transmitted to be usable by the service provider's data system in an automated fashion without the interaction of the customer with service personnel. The software application is accessed and the customer is presented with a set of menu items to disclose the identification of the customer, the item being left for service or exchange, the information required for service and instructions to the customer on how to properly secure the vehicle or service item in a drop area and/or secure an object that is needed to access the vehicle or service item such as a key or other object with the service provider. A receipt or work order is presented to the customer with information on the service to be performed and options for required maintenance of the item that the customer may also authorize. The work order may then be printed and signed and stored with the service item or be transmitted and authorized by the customer using an electronic signature to record the transaction. The customer is then prompted using a menu item for a contact platform to be used to establish communication between the customer and the service provider. In choosing the contact platform the express mobile software application system sets up an automated notification link, transmits a message to immediately notify the service provider that an item has been dropped off or picked up and transmits a notification for confirmation of this transaction to the customer through the selected contact platform, such as a recorded voice message, text message or an alarm notification using email, a cellular phone, iPhone, iPad, smartphone, tablet or other computer system. The express mobile software application may be implemented through a web-based or mobile applet using and may provide a sound notification or an icon display for notification on the contact platform.

The use of the express mobile software application system allows the service provider to improve scheduling of work because the proper information for service has been effectively communicated and similar service jobs in total time required or complexity can be grouped and prioritized based on current workload and parts availability. The express mobile software application system also allows the service provider to immediately review the transaction and contact the customer if further information is needed. The customer is also not delayed in notification of costs or completion of repairs and the express mobile software application system may also provide to the customer notification of future appointments for scheduled maintenance of the item or vehicle.

It is an object of the present invention to automate the drop-off and pick-up aspects of service related businesses using a specified contact platform implemented using the express mobile software application to provide automated notification for a more convenient and efficient system of completing these aspects of the transaction.

It is a still further object of the present invention to provide an express mobile software application system that allows the customer to drop-off/pick-up goods associated with the service during all hours of the day and night, even when the service provider is closed.

Another object of the present invention is to use the express mobile software application to associate data with a vehicle or other service item involved in the drop-off/pick-up, where the data can be modified by the customer and/or the service provider and be transmitted and transformed using the express mobile software application to be useable data for the data system of the service provider to track, identify and relay data in the form of information to the express mobile software application that transforms the data into instructions and information to the customer and/or to the service provider, and that transforms, transmits and stores other data associated with the vehicle or other service item within the express mobile software application and data system of the service provider.

A further object of the present invention is to provide the express mobile software application that transmits, transforms, and stores data associated with the vehicle or other service item to be recognizable to a user such as a customer or service provider to provide for the analysis, modification, or conveyance of the data using different media, including a computer system within a kiosk, hardware connected to the server, a cell phone, smart phone, iPhone, iPad, a PDA, iPhone, tablet, laptop or other digital device through a wired or wireless connection to the internet.

A still further object of the present invention is to use the express mobile software application system to relate the data associated with the vehicle or other service item to past and future transactions involving the service and repair of the vehicle or other service item and using the notification system of the express mobile software application to provide notifications that are recognizable to a user on the status or future service requirements of the vehicle or other service item. For example, in the auto repair service industry, the express mobile software application system may provide for an indicator within a user interface to allow a user to access data on what type of repairs were done to the vehicle in the past. The express mobile software application using calendar and scheduling software application features may further schedule events in the future, e.g., oil changes and other required service.

It is another object of the present invention for the express mobile software application system to have a user-friendly interface that may be implemented on various digital devices having different mediums to present useful information and data associated with the vehicle or other service item in a manner recognizable and useful to a particular user such as by presenting different information to a service provider related to the repair of the vehicle than data for a customer related to the cost of the repair and the time the vehicle servicing is finished.

Yet another object of the invention is to provide an express mobile software application system that provides an automated method and system for a user to drop-off a motor vehicle for service that provides notification to the service provider when the vehicle or other service item is dropped off and that provides notification to the customer to pick-up the vehicle or other service item after service is complete.

A further object of the invention is to provide an internet or mobile application based express mobile software application system that provides a secure method and apparatus to identify the customer as the owner and/or user of the vehicle or other service item, identify the vehicle or other service item, identify the service to be performed, allow for secure payment for the service performed, and provide secure access to the customer to pick the vehicle or other service item when service is complete.

The present invention is related to a software application system executable on a computer platform for facilitating the drop-off and pick-up of an item for service without the requirement of interaction between a user and service personnel, comprising a software application executable on a digital device having a processor, memory and data storage, the software application transforming and transmitting data displayable through a user interface to be recognizable to a user; the software application system comprising; means for processing input from a user for the identification of the user; means for processing input from the user or a service item for the identification of a service item; means for creating a unique identifier from data related to the identification of the user and the identification of the service item; and wherein the software application system permits access to the software application and to the service item using the unique identifier without interaction between the user and service personnel. The software application system wherein the software application may comprise a notification interface that communicates to a user specified contact platform. The notification interface may communicate through the user interface transformed data comprising service, cost, time for repair, and completion of service and notification of future appointments. The software application system may comprise a camera and the software application may comprise means to convert and encode a picture of an alphanumeric string to create the unique identifier. The alphanumeric string to be used in the creation of the unique identifier may be a vehicle identification number. The software application may comprise means for associating an object from the user with the unique identifier, the object permitting access to the service item and the service item may be a vehicle and the object may be a key to the vehicle. The software application system may comprise a goods exchange area for receiving the item to be serviced; a container for receiving the object; and the software application may comprise means for associating the unique identifier with the container to associate the object with the user and the service item. The container for receiving the object of the software application system may be a plastic ball.

The present invention is further related to a software application system executable on a computer platform for facilitating the drop-off and pick-up of an item for service without the requirement for interaction between a user and service personnel, comprising a software application executable on a digital device having a processor, memory and data storage, the software application transforming and transmitting data displayable through a user interface to be recognizable to a user; the software application comprising means to convert and encode a picture of an alphanumeric string to create a unique identifier; and the software application comprising means for associating the unique identifier with a user and a service item. The software application system, software application may comprise means for associating an object with the unique identifier, the object permitting access to the service item.

The present invention is further related to a method of automated drop-off and pick-up of a service item without interaction with a service provider comprising the steps of implementing a software application executable on a digital device having a processor, memory and data storage, the software application transforming and transmitting data displayable through a user interface to be recognizable to a user; processing input from a user for the identification of the user; processing input from the user or a service item for the identification of the service item; transforming the identification of the user and service item to a unique identifier; and permitting access to the software application and to the service item using the unique identifier. The method may comprise implementing a notification interface for communicating with a user specified contact platform and the notification platform may communicate transformed data comprising service, cost, time for repair, completion of service to the item and notification of future appointments. The method of automated drop-off and pick-up of a service item without interaction with a service provider may comprise converting and encoding a picture of an alphanumeric string to create the unique identifier. The steps of creating the unique identifier of the method of automated drop-off and pick-up of a service item without interaction with a service provider may use an alphanumeric string that is a vehicle identification number. The method of automated drop-off and pick-up of a service item without interaction with a service provider may comprise associating an object with the unique identifier, the object permitting access to the service item. The method of automated drop-off and pick-up of a service item without interaction with a service provider may comprise dispensing a container for the object and associating a unique identifier with the object, the container, service item and the user. The method of automated drop-off and pick-up of a service item without interaction with a service provider may comprise forming the container as a plastic ball.

These and other features, advantages and improvements according to this invention will be better understood by reference to the following detailed description and accompanying drawings.

BRIEF DESCRIPTION OF THE DRAWINGS

FIG. 5 is an embodiment of a home screen in an embodiment of the express mobile software application of the present invention;

FIG. 6 is an embodiment of a registration screen in an embodiment of the express mobile software application of the present invention;

FIG. 7 is an embodiment of a registration screen including information about the service provider and customer in an embodiment of the express mobile software application of the present invention;

FIG. 8 is an embodiment of a registration screen including vehicle information in an embodiment of the express mobile software application of the present invention;

FIG. 11 is an embodiment of an express service screen including selected service items in an embodiment of the express mobile software application of the present invention;

FIG. 12 is an embodiment of an express service time for repair screen in an embodiment of the express mobile software application of the present invention;

FIG. 21 is an embodiment of a ala carte service screen in a further embodiment of the express mobile software application of the present invention;

DETAILED DESCRIPTION OF THE INVENTION

Figure 1:
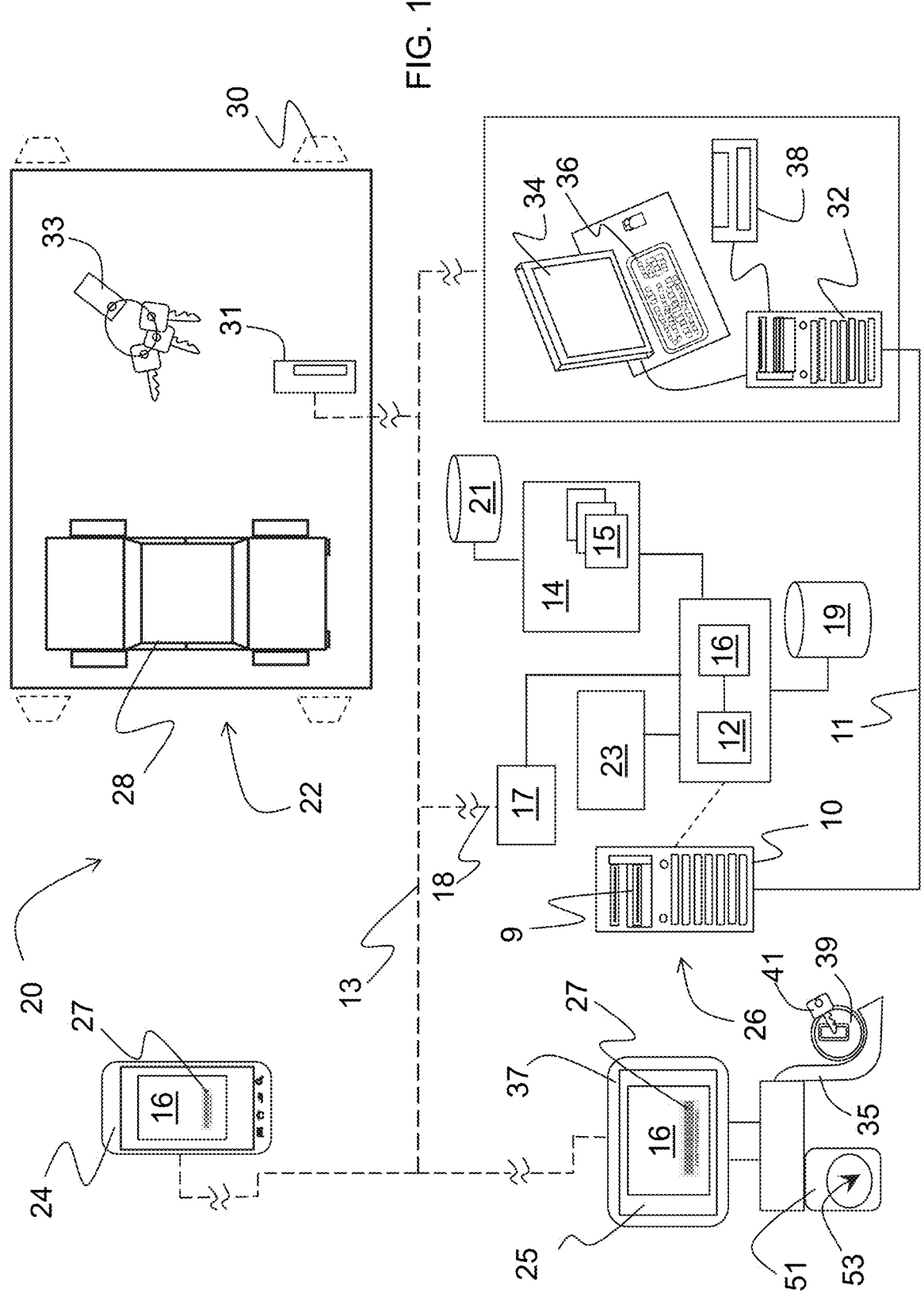
FIG. 1 is a schematic block diagram of an embodiment of the system for an express mobile software application service of the present invention.

FIG. 1 shows a diagrammatical representation of the express mobile software application system 20 of the present invention. The express mobile software application system 20 contains the main elements of a goods exchange area 22, the express mobile software application 16, and a service provider's data system server 26. The express mobile software application 16 may be implemented on a digital device having a microprocessor, memory, and data storage which may be a mobile smartphone 24 for example owned by the customer or a computer system 25 within a kiosk 37 that is near the goods exchange area 22. The express mobile software application 16 may be integrated with a service provider's data system server 26 to manage communication and the transformation and transmission of data such as information associated with a service item 28. The express mobile software application system 20 provides for information about the service item 28 to be transformed and be transmitted to the data system server 26 through a through a wired 11 or wireless connection 13 and further establishes communication between the customer and the service provider. Both the customer and service personnel can access the goods exchange area 22 and may access an available digital device such as a computer system 25 within the kiosk 37, but in most instances only service personnel can directly access the data system server 26.

As shown in FIG. 1, the goods exchange area 22 is the location designated as a secure drop-off and pick-up area by the service provider that facilitates the operation of the express mobile software application system 20 of the present invention. This area 22 can vary from a parking lot for auto services to any appropriately sized container, for example, for video rental services or be simply a mail receiving location where an item for service is shipped to and received by the service provider. As previously noted, both customers and service personnel can access the goods exchange area 22, although the area may contain sections that have limited access for the service personnel only. The goods exchange area 22 may also have optional sensors 30 that collect data from the good itself when it is being dropped-off or picked-up. These sensors 30 could use technology such as radio-frequency identification (RFID) chips, bar-coding, or some other form of automatic identification technology as is known in the art. The sensors 30 could also be used to detect physical characteristics of the service item 28, such as the height, weight, or shape of the item. The sensors 30 may also simply be motion sensors that detect movement in the goods exchange area 22 and thereby trigger the express mobile software application system 20 to turn on to provide for a customer to drop-off or pickup their item after hours when the service provider is closed.

In some embodiments of the present invention, the goods exchange area 22 and/or the kiosk 37 can be equipped with an electronic reader 31 which reads a unique identifier 27 from for example the display screen of a digital device such as the customer's smartphone 24 and/or from a key fob 33, an input card, or from another item that may be carried by the user where the item contains either a magnetic identification number, bar code or other electronic, magnetic or optical readable indicia as the unique identifier 27. Using the unique identifier 27, the customer may gain access to the express mobile software application 16 which will instruct the data system server 26 to access or retrieve customer information from within a database in the service provider data system 26, or retrieve the customer's identification information stored directly on the digital device, input card or key fob 33 that includes the unique identifier 27. The express mobile software application 16 creates the unique identifier 27 that may be in the form of an alphanumeric character string, a picture of a readily identifiable object, a customer selected question and answer, a sensor, or a printed barcode. The unique identifier 27 may further be in the form of a code that can be derived from a phone number, a driver's license number, a vehicle identification number, a user supplied alpha-numeric password, a computer generated number, a random number, or a code derived from a variety of numbers or codes to create a unique user identification for representing a specific user to the variety of network connected devices within the express mobile software application system 20. The user identification code as a unique identifier 27 will be understood to also include the combination of account identification and password to enable the express mobile software application system 20 to authenticate the user to any account without the user having to repeatedly enter any specific identification data. The unique identifier 27 may be stored on the customer's smartphone 24, on a key fob 33, an input card or other device for the customer to easily have the unique identifier 27 within reach to verify their identification when dropping off, checking the status of and picking up the service item 28 using the express mobile software application system 20, expediting each step of the service process. In this manner the user's identification and personal information such as name, address, phone numbers, and even secured credit card information for billing purposes, is securely with the customer and can be accessed and displayed instantly to the customer for review or at a touch of the finger be offered by the customer to the express mobile software application system 20 for the identity of the customer to be quickly verified for the customer to gain access to the express mobile software application 16 or service item 28.

Alternatively, in case the customer's smartphone 24, input card or key fob 33 is not available or working improperly, a user may utilize a login name, password, identification number or some other secure variable that can be directly input through the user interface of the express mobile software application 16 using a touch-screen display 34 or keyboard 36 or other data input device of a computer system 32. The computer system 32 may have a wired 11 or wireless connection 13 to the internet to access a web based implementation of the express mobile software application 16 which accepts the customer login name and password as verification to identify and retrieve the user's specific personal information. As shown in FIG. 1, the express mobile software application system 20 may provide at the kiosk 37 a container dispenser 35 that dispenses a container 39 such as a plastic ball having a slot that the customer after accessing the express mobile software application 16 may place the key 41 to their vehicle in. The dispenser 35 may have a catch bag 51 with a chute 53 that provides for the container 39 shaped as a ball to roll along the chute and through the wall and be secured inside the service provider's building. The express mobile software application 16 associates the container 39 with the customer's unique identifier so that when picking up their vehicle, the dispenser 35, dispenses the correct plastic ball container 39 that has the customer's key 41. The container 39 is adequately sized to hold any type of key, or newer style key fob for any make or model of vehicle. In other embodiments, an envelope or other type of container suitable for the size and shape of the service item or suitable for the size and shape an object that is necessary to access the service item 28 may be provided within the scope of the present invention. The unique identifier 27 associates the vehicle, service item and other object with the customer for proper identification and accurate access and retrieval of the vehicle or service item without the requirement for interaction with service personnel.

FIG. 1 also shows the data system server 26 at the service provider which may be near the goods exchange area 22 that has an implementation of the express mobile software application 16 installed to facilitate communication between the customer and the system server 26. The data system server 26 may be connected with one or more digital devices such as a computer system 32 that has a display 34 for displaying information, input means for inputting information 36, and an optional printer 38. In some embodiments as described above, the express mobile software application 16 may be accessible through a web based application and the service provider may provide a computer system 32 that is accessible by both the customer and the service personnel, where the customer will access the express mobile software application 16 using a login name and password and then mainly input and receive information about their service item 28. The service personnel may generally access the computer system 32 as needed. The express mobile software application 16 may also be implemented on computer system 25 within a standalone kiosk 37 that is connected to or within a building, such as an outside portion of one of the buildings used by the service provider. It is also to be appreciated that the express mobile software application 16 may be implemented on a cell phone, a smartphone, a PDA, an iPod, an iPad, a tablet computer, a laptop or any other readily accessible wired or wireless personal communication digital device, also described below as a contact platform through which the user can communicate, i.e. receive and send data to and from the express mobile software application system 20. The display 34 for the user interface can range from a simple light-emitting display to a touch-screen display for example using a tablet computer in a kiosk 37. A touch screen display can function as both display 34 and input means such as a keyboard 36 or mouse. Data within the user interface will be recognizable to a user and will be transformed using the express mobile software application 16 to a series of menu options and input boxes that convey information to the customer, and receive input information from the customer about the service item 28.

The means for inputting information 36 to the express mobile software application 16 can include, for example, a mouse, a keyboard, or a touch-screen device. This information on the service item 28 is communicated to the service provider data system server 26 using communications protocols defined by the express mobile software application 16. The express mobile software application 16 is also implemented on the data system server 26 that includes a computer system 10 with a microprocessor-based unit 12 that provides means for processing the transactional data to produce readily discernible, informational and organized images and data on the intended output device or media using the express mobile software application 16. Those skilled in the art will recognize that the present invention is not limited to just these mentioned data processing functions. The server computer 10 shown in FIG. 1 can store computer programs by having a program stored in an internal or external computer readable storage medium 9, which may include, for example: magnetic storage media such as a magnetic disk or magnetic tape; optical storage media such as an optical disc, optical tape, or machine readable bar code; solid state electronic storage devices such as random access memory (RAM), read only memory (ROM) or flash memory or other data storage devices. The associated computer programs may be stored locally and or remotely on a virtual machine (VM) or data center using any other physical device or medium employed to store a computer program indicated by offline memory device. For example, the express mobile software application 16 can be implemented using a system including one or more digital communications devices and/or one or more personal computer systems. The digital devices may be connected wirelessly, using WiFi, Bluetooth, cellular or other radio-frequency links, and it is to be appreciated that such devices can be mobile devices (e.g., iPod, iPad, tablet computer, notebook, laptop, smart phone, or cell phone that can be used as a processing unit, a display unit, and/or a unit to give processing instructions), and as a service offered through a wired connection 11 or wireless connection 13 via the internet.

The express mobile software application 16 may be built using a combination of HTML, CSS, Java Script, JQuery, and PHP or other software languages where those skilled in the art will readily recognize that the equivalent of such software may also be constructed in computer, electrical and communications hardware. The express mobile software application 16 may have a notifications interface 17, code related to the software application 16 and administrative tools 23. The notifications interface 17 may be an email server, voice mail system, text messaging system or other communications system to transmit messages and notifications to users of the express mobile software application 16. The administrative tools 23 set and prioritize access and features to users based on requirements of use. Data records 15 such as an inventory of service parts, costs, and pricing may be accessible to some or all users as determined by the administrative access established for each user. Because data manipulation algorithms and systems are well known, the present description emphasizes algorithms and features forming part of, or cooperating more directly with the method and hardware of the presently disclosed invention. General features of databases, digital communications devices, email and computerized systems are likewise well known, and the present description is generally limited to those aspects directly related to the method and related hardware of the invention. Other aspects of such algorithms and apparatus, and hardware and/or software for producing and otherwise processing the data involved therewith, not specifically shown or described herein may be selected from such systems, algorithms, components, and elements known in the art.

Implementation of the express mobile software application 16 may be in conjunction with one or more database management systems (DBMS) 19 such as Oracle, IBM DB2, Microsoft SQL Server, PostageSQL, MySQL, or others using widely supported database languages such as SQL to define and manipulate data and perform data queries. Other aspects of such algorithms and apparatus, and hardware and/or software for producing and otherwise processing the data involved therewith, not specifically shown or described herein may be selected from any such systems, algorithms, components, and elements known in the art. The software application and computer platform may be hosted on a SSL, SSL 256, SHTTP bit secured server as a fully redundant data center. The platform may have multiple levels of security and layers of redundancy built in to make sure that all data and personal information is secured and not open to the public. Data replication and redundancy may be performed automatically and all servers may be secured in optimal conditions. The implementation may further provide synchronization of local and remote desktop clients using virtual machine check in and check out operations to maintain access to the most recently updated local or remote copies that reflect user changes to software programs and accessed data files.

In each context, the invention may stand alone or may be a component of a larger system solution. Furthermore, human interfaces, e.g., the input, the digital processing, the display to a user, the input of user requests or processing instructions, the output, can each be on the same or different devices and physical locations, and communication between the devices and locations can be via public or private network connections, or media based communication. Where consistent with the foregoing disclosure of the present invention, aspects of the method of the invention can be fully automatic, may have user input (be fully or partially manual), may have user or operator review to accept/reject the result, or may be assisted by data or metadata (data or metadata that may be user supplied, supplied by another computer program or database from a different application or determined by an algorithm). Moreover, the algorithm(s) may interface with a variety of workflow user interface schemes.

The express mobile software application 16 of the present invention may be implemented through the application software downloaded to the server 10 and/or as a web-native software application delivery model or SaaS (Software as a Service) to be hosted and operated as an on demand computing service such as a cloud or shared resource database through a web browser using the internet through a wired 11 or wireless internet connection 13. The express mobile software application 16 may include policies and protocols in cloud description language (CDL) and domain specific languages (DSL) for this implementation to manage and monitor secure access and system usage to one or more domains to provide multiple virtual servers with each server serving one or more instantiations of the express mobile software application system 20. Security of the virtual server is provided by having a separate virtual server setup for each service provider or service provider location using a unique domain name that may be active solely during the period of the software implementation, and may be immediately deactivated at any time. Each virtual server has data storage where unique data records specific to the service provider are stored within a database and secured. At all times, the service provider's transactional data is protected from unauthorized access and copying through the secure management protocols of the express mobile software application system 20.

The data system server 26 of the service provider may also have an item informational database 21 with data on all types of items serviced through the service provider and a service history database 14 with records 15 of all prior service completed on a specific item. Upon receiving information specific to the service item 28, the data system server 26 using the express mobile software application 16 to access the service history database 14 for additional information either specific to the particular service item seeking service such as identification information of the service item, the customer and past repair work done, or retrieves general information about the service item from the item informational database 21. This database may be an internal database or may be an external item database accessed through the data system server 26 to an internet connection 18 to retrieve information on new items that have not been serviced before. This item information from the item informational database 21 is used to create menus and options that are presented using the express mobile software application 16 to the user, for the user to make choices and enter information. For example, if the service item 28 is new and has not been serviced before, the customer enters the make of their automobile; using the express mobile software application 16, the data system server 26 accesses information on the item from the external item informational database 21 through the internet connection 18 to retrieve list of models specific to that automobile manufacturer for the user to select from. A list of year of manufacture, options such as automatic or manual transmission, the color of the car and other features are retrieved and suggested to the user to either select from a menu option or enter through the user input 36 using a keyboard, mouse or touch screen on the customer's mobile device 24 or using the express mobile software application 16 implemented on the computer system 25 within a kiosk 37. Through the menu selections and user inputs using the express mobile software application 16, the data system server 26 acquires all identification information necessary for the service item 28.

The user is then prompted to either confirm personal identification information such as the customer's name, address, and payment or warranty information, which has been retrieved from the service history database 14 or the input card 33 or the customer is prompted to enter or correct this information. The user is then prompted within the user interface for information about the repair required for the service item. Upon receiving information on the repair from the express mobile software application 16, the server 26 retrieves data from the item informational database 21 and presents a service selection menu and input boxes to allow the user to describe what the specific problem of the item is, enter information on past service from other service providers on the item, and select or enter what service is currently wanted; and/or enter other information relevant to the service transaction. The service selection menu also provides to the user information on estimates for time and costs for repair and may also through the server 26 access the inventory database 19 to check for current inventory levels of parts that are needed in the repair to properly estimate completion time.

The data system server 26 communicates with the customer using the express mobile software application 16 and also with the internal and external databases and systems of the service provider through an internal local area network or external internet connection. The data system server 26 also includes an automated notification interface 17 that is operational through the express mobile software application 16 that accesses the internal databases of the service provider's data system server 26. Using the express mobile software application 16 the information provided by the customer and the service provider, is transformed using the automated notification interface 17 to generate notifications, cost estimates, quotations, and requests for information to facilitate immediate notification between the customer and the service provider. By implementing the express mobile software application 16 on any digital device the customer my choose any contact platform for communication using the automated notification interface 17 and communication is established from a selection by the customer of a menu prompt within the express mobile software application 16. When prompted, the customer may select the appropriate contact platform for notification through either recorded messages to the customer's telephone number or through text messaging, to a cellular phone, or by email, or through a smartphone, PDA or iPhone using a web based software application or mobile applet. Because of the similarity in the types of messages communicated, the express mobile software application 16 may use templates and optional fields to personalize a message to a certain individual with specific content of the transaction and repair from the service history database 14. The contact platform may also be used to allow the customer to connect to the data system server 26 remotely using a wireless or internet connection and provide the initial required information to the service provider and then complete the steps of either dropping off the item at the goods exchange area at a later time or mailing the item to the service provider or any other method whereby the service provider receives the service item. The notification interface 17 would then allow the service provider to send a confirmation to the customer upon receiving the item to be serviced. The express mobile software application 16 is optionally connected to a printer 38 that may take the form, for example, of an inkjet printer, a laser printer, or a thermal printer. The printer 38 is used to print information relating to the service transaction for the customer to keep as a record or to include with the service item 28 to identify additional information or specifics regarding the repair.

Figure 2:
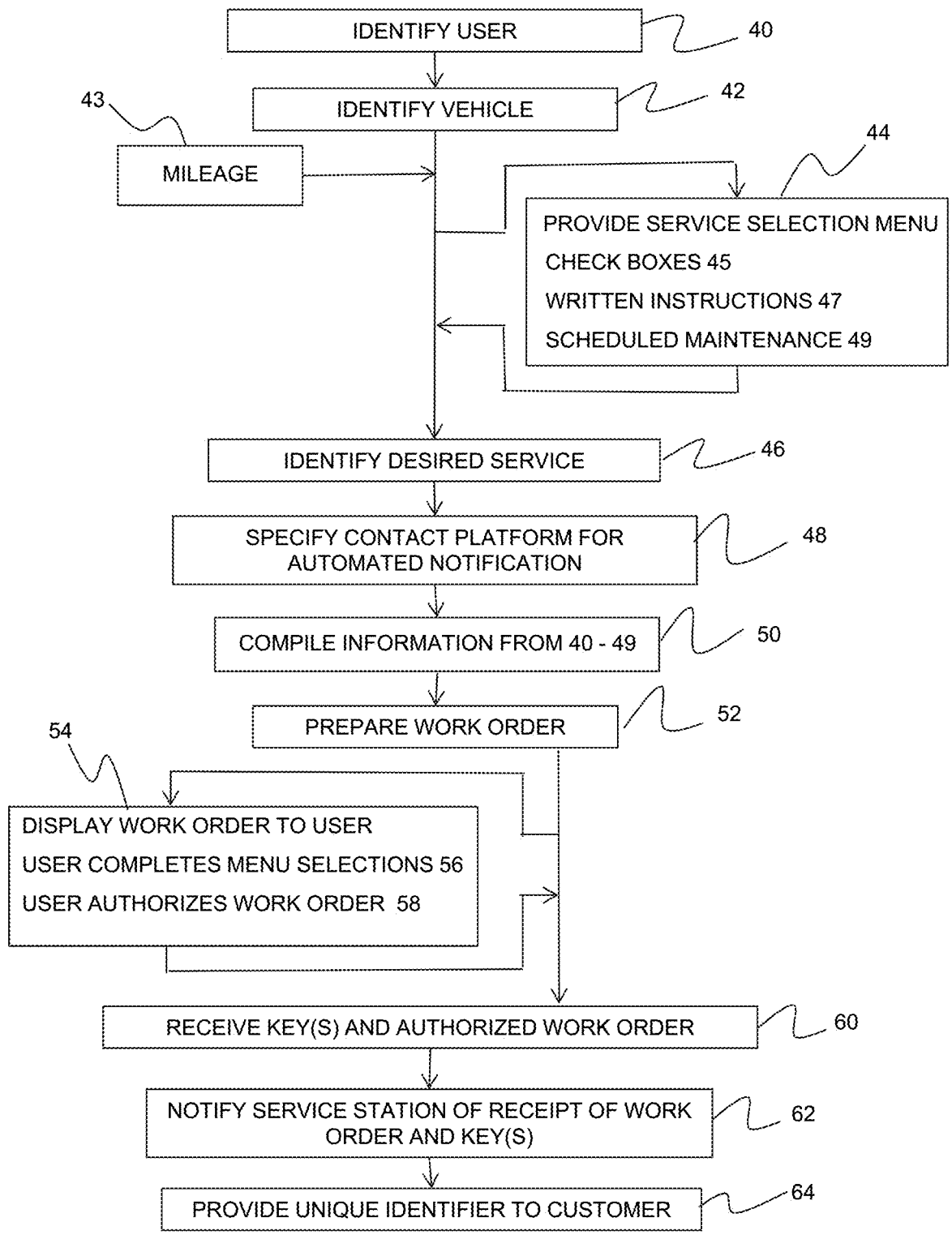
FIG. 2 is a schematic block diagram of the steps of one embodiment of the express mobile software application and pick-up service for the present invention.
Figure 3:
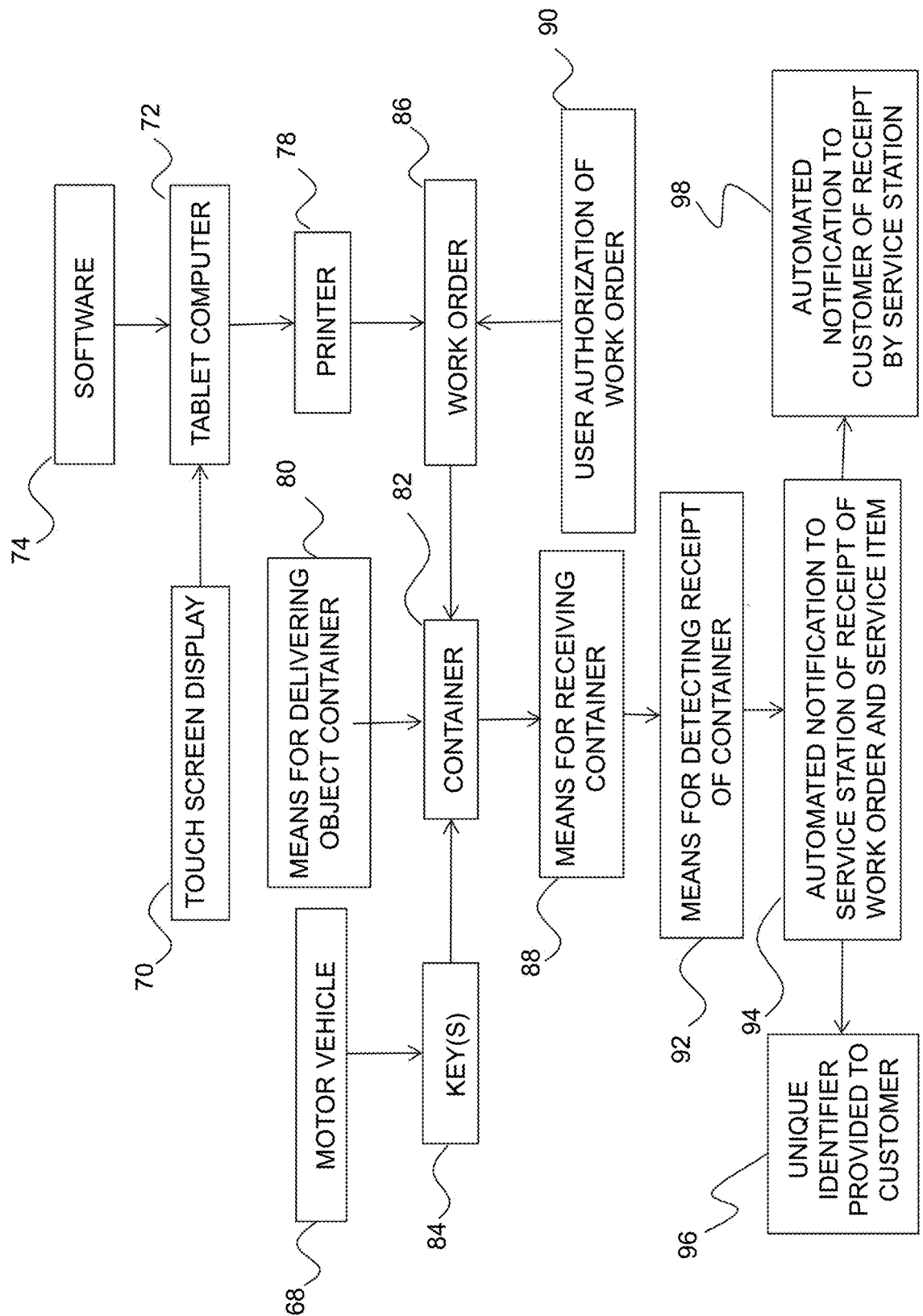
FIG. 3 is a schematic block diagram of an embodiment of the system for an express mobile software application and pick-up service for motor vehicles.
Figure 4:
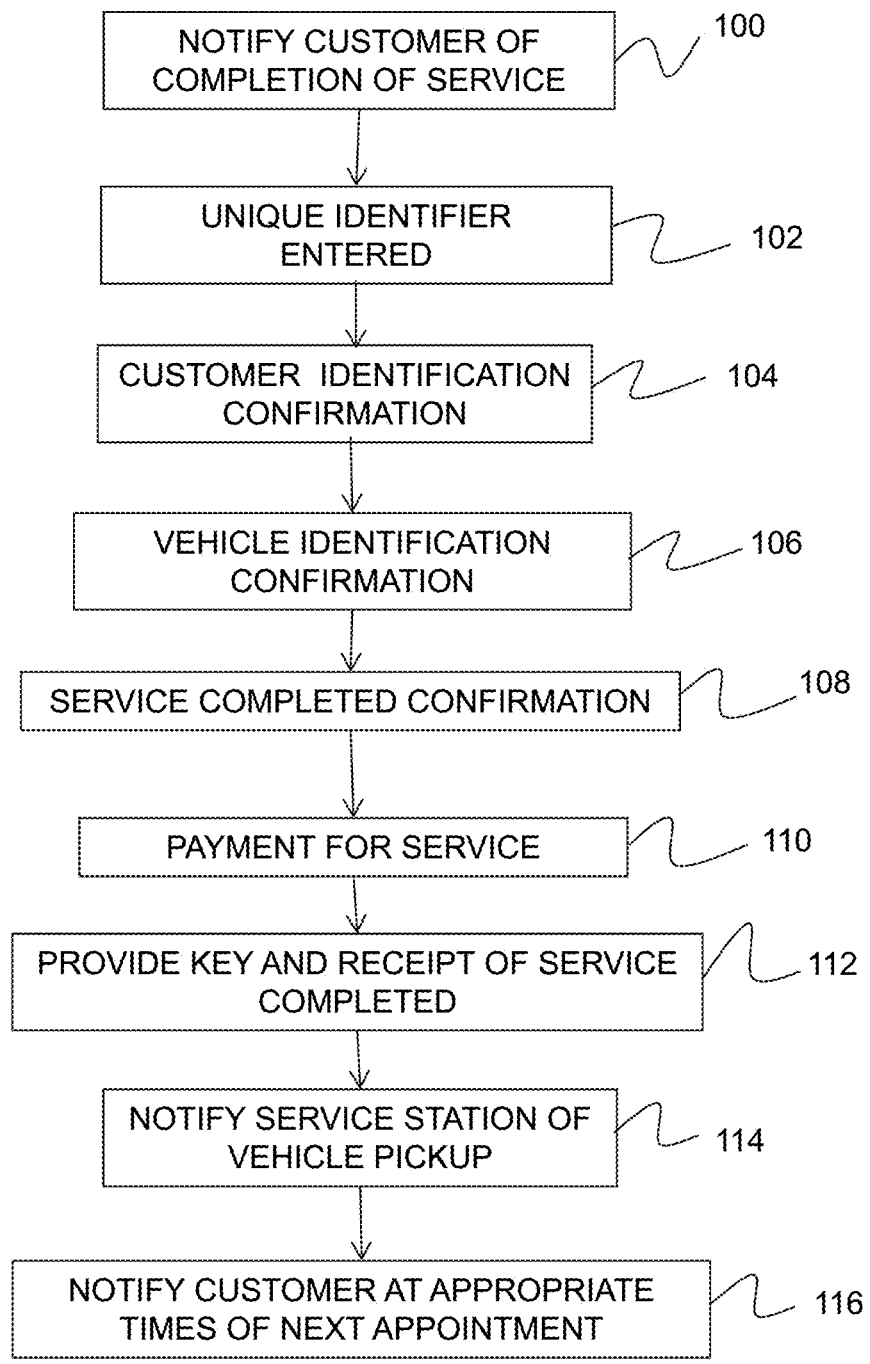
FIG. 4 is a further embodiment of a schematic block diagram relating to the specific process using the express mobile software application to securely retrieve a vehicle or other service item from the service provider.

FIGS. 2, 3 and 4 illustrate an embodiment of the invention for use with motor vehicles for example, although other goods could also be used with this system. As shown in FIG. 2, the method of the present invention can include the steps generally accomplished using the express mobile software application 16 of identifying the user 40, identifying the motor vehicle 42 and mileage 43 and providing a service selection menu to the user at step 44. This service selection menu can include check boxes 45 or other easily chosen indicia for common service tasks and for example routine scheduled maintenance 49 based on the cars mileage input by the user at 43 as well as identifying the desired service 46 from the check boxes 45 and any written instructions at 47. The user can be prompted to specify the contact platform for the service provider for the system to automatically contact and reply to the user through the notification system at step 48. After compiling this information in a predefined format at step 50, the system then prepares a work order for the user to sign and/or authorize the service 52 in some manner. This work order is displayed to the user at step 54 and the user can complete a review by checking and/or un-checking specific check boxes corresponding to service descriptions on the work order at step 56. After completing the review the user may authorize the work order at step 58 by for example providing a digital signature which provides to the service provider acceptable verification to allow the service provider to legally begin work, without the formal signature of the user. The system and device is also configured to receive a key from the user and receive the authorization from the user for the work order 60, and notify the service and accounting/billing department of the service provider of the receipt of the work order and key 62 and providing a work order number or other unique service receipt identifier to the customer at step 64.

An important aspect of the present invention is that the express mobile software application 16 prepares the work order at step 52 by accessing information from the data system server 26 of the service provider. The work order can be presented to the user immediately at the kiosk computer system 25, through the web based software application 16 or mobile based software application 16 via the appropriate contact platform such as on the user's smartphone 24. In an embodiment of the present invention the express mobile software application 16 provides a service selection menu at 44 to the user which can allow the user to both pick from predefined service applications i.e. scheduled maintenance, and/or describe the specific problem or issue of the item using features of the express mobile software application 16. The express mobile software application 16 compiles the information into the work order at 50 which can be presented directly, and immediately to the user at step 54. The user can approve the service at step 58 by indicating using a signature screen of the express mobile software application 16 and providing a digital signature for authorization of the work order by checking an appropriately displayed icon, signing their name on a touch screen display, printing the work order and signing their name or executing an instruction for authorization as prompted by the express mobile software application 16.

The work order presented at step 54 can also display any recommended maintenance or tests on the service item 28 based for example on vehicle mileage entered by the user upon an appropriate prompt by the express mobile software application 16. If this recommended maintenance or tests are to corresponding service entries, the user can either agree or not agree to such recommended maintenance or test prior to authorization of the work order. It is to be appreciated that such a step of choosing service can occur either at step 46 and/or at step 56 where the user is reviewing the work order prior to authorization. It is possible that each different service entry on the work order may be easily authorized or not by providing check boxes or icons which can be quickly displayed to the user using the express mobile software application 16 and an authorization indication feature of the express mobile software application 16 correspondingly associated with each service entry on the work order.

Once the work order is authorized by the user or customer, the key 41 or other object needed to access the service item can be received at step 60 and the work order can be directly forwarded to the technicians at step 62 without any intermediate personnel needing to have input to the work order. Also, the work order can be sent to the billing/accounting department so that the appropriate initial notation and accounting for service work can be undertaken. Generally, the customer is not charged, nor any billing to the client is provided until the service work is done. However, the early notification to the billing/accounting department using the express mobile software application 16 facilitates the creation of a quotation for different types of work that can be reviewed by the customer within the work order. The initiation of the final billing and invoicing of the customer may also begin, even where modifications and/or amendments may be made to the customer's bill. The express mobile software application 16 also schedules the next appointment or a tentative appointment, and provides reminders for the user prior to the next appointment, based on the input mileage and of information about the repair required for the service item.

Another important feature of the express mobile software application system 20 is a secure method of transferring the service item 28 both from the customer to the service provider and from the service provider to the customer without the requirement of interaction between the customer and service personnel. The automated notification interface 17 notifies the service provider immediately upon completion of the transaction, and the service provider acknowledges the transfer by sending an automated receipt of the transfer to the customer. The express mobile software application system 16 further creates a unique identifier 27 and provides the identifier 27 to the customer to provide for the customer to access information about the repair of their service item 28 using the notification interface 17 and to securely identify themselves to pick-up the service item 28 even when service personnel are not available. In one embodiment of invention as shown in FIG. 3, the system is used for the automated drop-off of a user's motor vehicle 68 for service at a motor vehicle service provider. In this embodiment, the express mobile software application system 20 includes a touch screen display 70 for presenting information to, and receiving information from the user, a tablet computer 72 in communication with the touch screen display 70, and an embodiment of the express mobile software application 74 running on the tablet computer 72 for interacting with the user. As described above the express mobile software application 74 and tablet computer 72 may be connected with databases from the service provider's data system server 26 to include menu and optional input to present to the user for user identification, for identification of the type of motor vehicle 68, and for identifying the service desired by the user. The express mobile software application 74 further provides templates for preparing a work order 86 for the user. The work order 86 is presented to the user for review and the user is then prompted to specify a contact platform and to provide an electronic signature to authorize 90 the service operations specified in the work order. The authorization 90 triggers a means for the service provider to receive a key 84 to receive the motor vehicle 68 from the user. The express mobile software application system 20 may provide a secure container 82, such as a plastic ball, an envelope or drop box for the user to insert the key 84 and a means for receiving the key 84 by the service provider 88. The work order 86 may also be printed for the user to sign to provide user authorization 90, and may be placed into the container 82 with the key 84. The container 82 is then inserted into the means for receiving the container 88.

Alternatively, the work order 86 can be printed directly on the container 82 such as an envelope in order to facilitate clear identification of the motor vehicle key 84. The means for delivering the container 80 to the user can be, for example, a container dispenser 35, an envelope feeder or other mechanism, while the means for receiving the container 88 such as the plastic ball container 39, or an envelope containing the key 84 can be a catch bag 51 with a chute 53 or any other any means which permit only authorized personnel to access the key 84, for example, a drop box with a slot in the top, a hinged mechanism such as that found on U.S. Mail drop boxes, pneumatic tubes and the like. The express mobile software application system 20 can also include means for detecting receipt 92 of the key 84, inside the container 82, from the user. For example, a weight sensor, a photodetector, metal detector, scanner, bar code reader and the like.

After the user delivers the motor vehicle key 84, the service provider is automatically notified, by an embodiment of the automated notification system 94 of the express mobile software application 74 that provides a message indicating receipt of the work order, and that the user has dropped off a motor vehicle 68 for service. The internal communication to the service provider using the automated notification system 94 can also be from a number of different contact platforms in order to facilitate rapid notification to the service provider, for example, of an automated voice recording on a phone call, an email message, or an alarm notification to a PDA or iPhone using a web applet. Upon receipt by the service provider of the motor vehicle, an automated notification is sent using the notification interface 94 of the express mobile software application 16 on the specified contact platform to the customer 98 confirming receipt by the service provider.

In order for the customer to securely pick-up the vehicle upon completion of service, a unique identifier 96 generated by the express mobile software application system 20, such as an alphanumeric character string, a picture of a readily identifiable object, a customer selected question and answer, a sensor, or a printed barcode is provided to the customer. This identifier must be accessible by or entered into the express mobile software application system 20 in order for the customer to pick-up the vehicle as described in more detail below.

In another embodiment of the invention, many of the steps can be accomplished remotely in advance of the user dropping off the vehicle or other service item 28, for example, through an internet-based or wireless-based communications contact platform. This would allow users to do many of the preliminary steps from a remote electronic digital device such as a computer, cellular phone, smartphone, PDA, iPhone, iPad, tablet computer, and the like. In this embodiment, the contact platform is remotely accessible to the user may access the express mobile software application 16 using their unique identifier or using a login name and password for web-based or mobile applet based interaction with the express mobile software application 16 providing one or more data entry dialog boxes, menu items and information for the customer to enter data to identify themselves as the user 40, identify the motor vehicle 42, identify the desired service 46, specify a contact platform for the service provider to contact the customer regarding the service 48 and prepare a work order 52 for the user. The user is then provided with the unique identifier 64 in the form of a code or alternatively a barcode that identifies the service item and user identification when the user arrives at the goods exchange area 22 and a work order is printed, authorized by the user 58, and the key 41 to the motor vehicle is securely placed in an envelope 82 or plastic ball container 39 from a kiosk dispenser 35 or in a drop box.

When service of the vehicle is completed the user is automatically notified that the vehicle is ready for pickup. In order to securely identify the user, when the user desires to pick-up the vehicle after service is complete, the user must input the unique identifier 27 into the express mobile software application system 20 before having the key 41 to the vehicle delivered. In an embodiment of the express mobile software application system 20, the method of the customer picking up the vehicle may include the steps that are shown in FIG. 4. These steps are: the express mobile software application system automatically notifies the client of completion of the repair 100, the unique identifier is entered into the express mobile software application system 102, the express mobile software application 16 confirms the customer's proper identification 104, the customer must further provide an input to confirm the proper identification of the vehicle 106 and the proper identification of the service performed 108, payment by the customer for the service 110, the key to the vehicle and a receipt of the service performed is dispensed to the customer 112, the service provider is automatically notified of pick-up of the vehicle 114 and automatic notifications of future service appointments or required maintenance are provided to the customer 116.

The automatic notification to the customer of completion of service using the contact platform, allows the customer to pick-up the vehicle in the shortest amount of time that is convenient for them, improving customer satisfaction. The pick-up of the vehicle is secure because only the customer has the unique identifier 27 which is required to allow access to the key 41 of their vehicle or other service item 28. This can be accomplished, for example, by having a unique identifier 27, such as an alphanumeric character string or a picture of a readily identifiable object, or a barcode or sensor that must be swiped through a scanner to allow proper identification of the customer. If an alphanumeric code or picture identifier, the user must input the identifier into the express mobile software application system 20. The user is then prompted with their name and address, and must select to confirm that the identification is correct 104. The user is then prompted for the identification of their vehicle 106 and the identification of the service 108 that was performed. With the use of a unique identifier 27 and the prior steps of receipt of the correct key properly identified, there is little chance that the express mobile software application system 20 could present an incorrect identity of a customer or vehicle, however added security measures that remove the human element of error may be included; such as the customer being prompted with a personal question and answer that was selected by the customer when dropping off the vehicle to further securely identify that the proper customer is picking up the vehicle. If there are issues the automatic notification system could immediately contact a service representative to assist a customer. The customer then completes a secure payment process 110 to pay for the service provided.

Proper confirmation of the identity of the customer and vehicle would allow the key 41 to the vehicle or other service item 28, and a receipt of the service performed 112 to be provided to the customer. The key 41 may be ejected from a secure dispensing unit 35 as part of the express mobile software application system 20 such as having the key within a plastic ball container or an envelope with the container being properly identified using the unique identifier 27. The customer will then access their vehicle or other service item 28 that will be parked proximate to the kiosk 37 or alternatively the unique identifier 27 may provide the customer access to a restricted access part of the goods exchange area 22 where the customer may pick-up their vehicle.

The integration of the express mobile software application system with both external and internal databases allows for service history and manufacturer maintenance requirements for a specific service item to be uploaded in the system. The automated notification system 17 provides for notification of scheduled required maintenance and future appointments 116 to be sent to a customer at appropriate time intervals to help ensure that a vehicle or other service item is properly maintained. Appointments may be scheduled based on complexity of the maintenance and the proper inventory of required maintenance parts as well as confirmation by the customer of availability for a future appointment.

As shown in an embodiment of the express mobile software application system 20 in FIG. 5, the express mobile software application 16 may be implemented as a mobile application on the smartphone 24 or other mobile digital device of the customer. The express mobile software application 16 may have a welcome screen 122 to introduce the software application and provide instructions to the customer. A logo 124 or other source identifier of the developer of the express mobile software application 16 may be provided. The name or version of the express mobile software application 126 may also be displayed. An access registration control button 128 may provide for the customer to open a screen to enter data about the service item, as shown in FIG. 6. The information to be entered may include a service provider dialog box or menu item 130 to type in or scroll to select the service provider. A specific name or location of a dealership of the service provider may be entered in a dialog box or selected from a menu item 132. The customer's first name dialog box 134, the customer's last name dialog box 136, and an option to select a contact platform 138 such as for communication through email, voice mail or text message may be options for the customer to enter data related to the service item 28. A vehicle name dialog box 140 may be optionally displayed, or alternatively the express mobile software application 16 may provide a scan registration option 142 that uses the camera 144 of the digital device to take a picture of the item and a picture of the item's label, serial number or other alphanumeric string that is converted using text recognition and encoded to be used in the creation of the unique identifier. For example, the customer may take a picture of the vehicle identification number (VIN) of an automobile and the express mobile software application 16 extracts the number and converts the number either directly or uses the number with other information such as the customer's driver's license number to encode the number within a barcode to be used as the unique identifier 27. Alternatively, the customer may take a picture of the serial number and label of a laptop computer for example and the express mobile software application 16 converts the serial number to a barcode or encodes the serial number with the customer's identification information such as the customer's name so that only a barcode reader and translator within the express mobile software application system 20 can read the unique identifier 27 and verify the identification of both the customer and the item 28. The entered customer data and contact platform information such as a contact using email is shown in FIG. 7. If the scan registration 142 has taken a picture of the VIN number 146 of the vehicle as a service item 28, information about the vehicle is populated by the express mobile software application 16. The information may include the year 148, make, 150, model, 152, type 154, and customer may enter the mileage 156 of the vehicle as shown in FIG. 8.

Figures 9, 10:
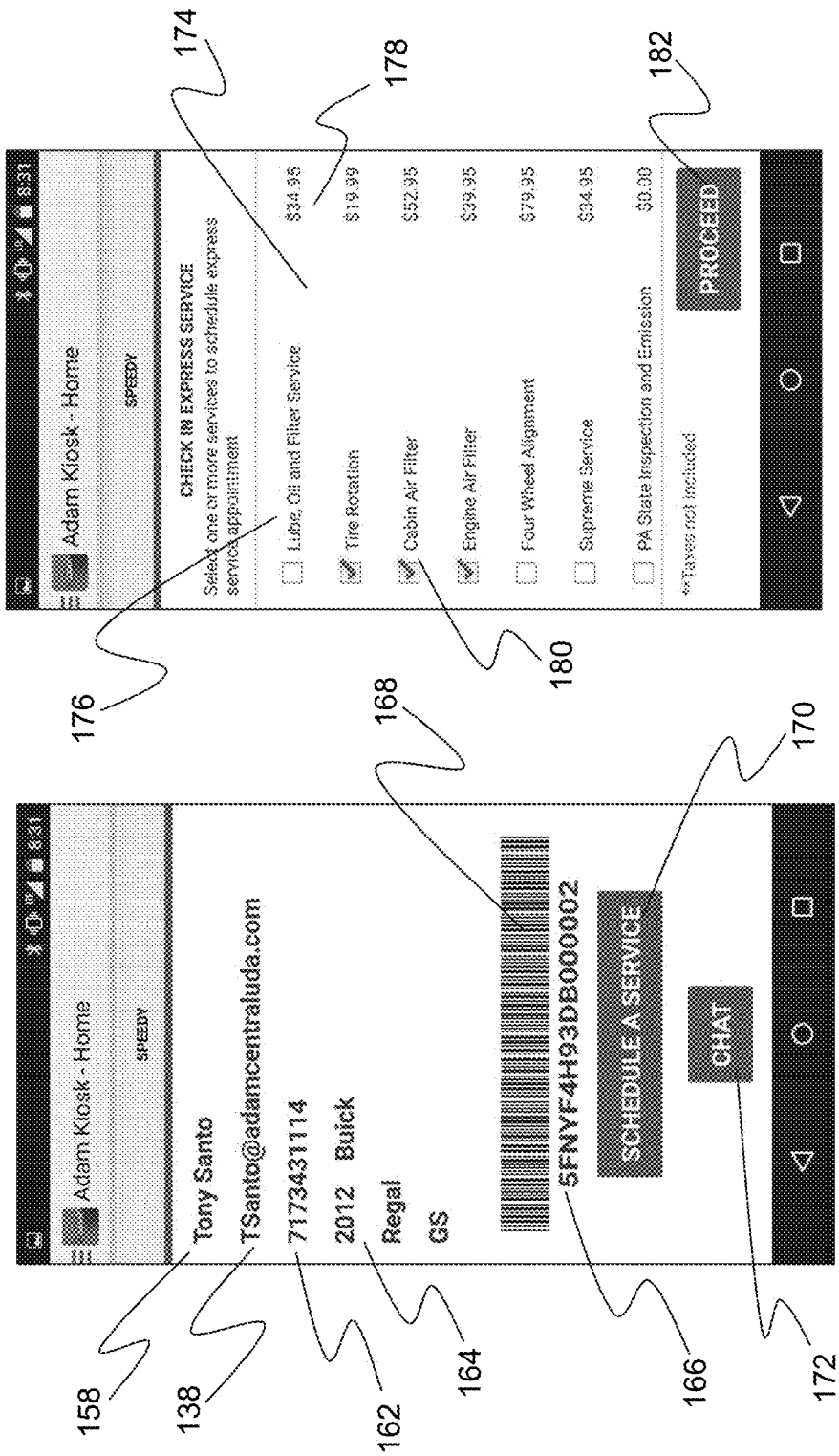
FIG. 9 is an embodiment of a registration confirmation screen including customer information, vehicle information and a unique identifier associated with the customer and vehicle in an embodiment of the express mobile software application of the present invention.
FIG. 10 is an embodiment of an express service menu including service items in an embodiment of the express mobile software application of the present invention.
Figure 14:
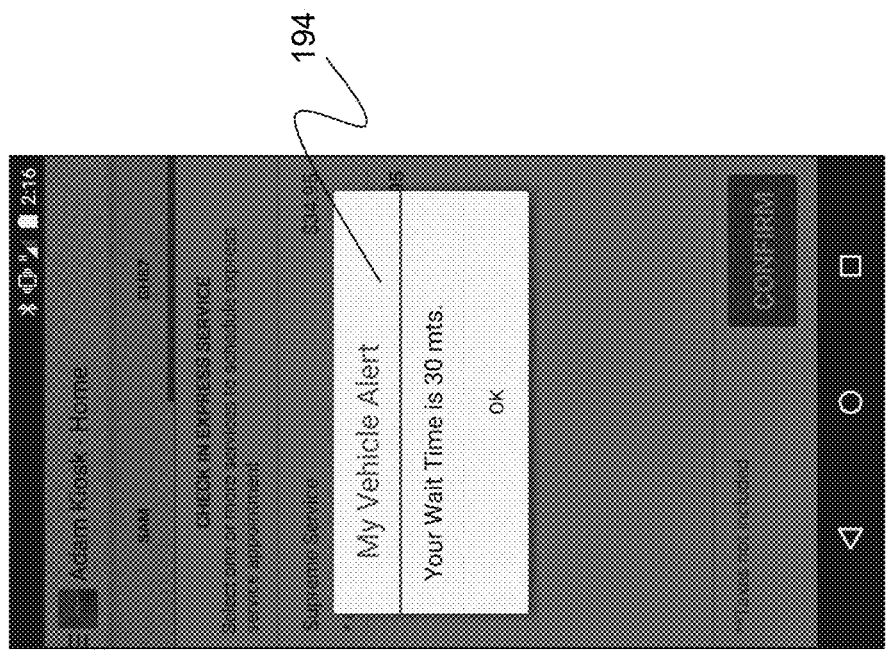
FIG. 14 is an embodiment of an express service time for repair screen in an embodiment of the express mobile software application of the present invention.
Figure 13:
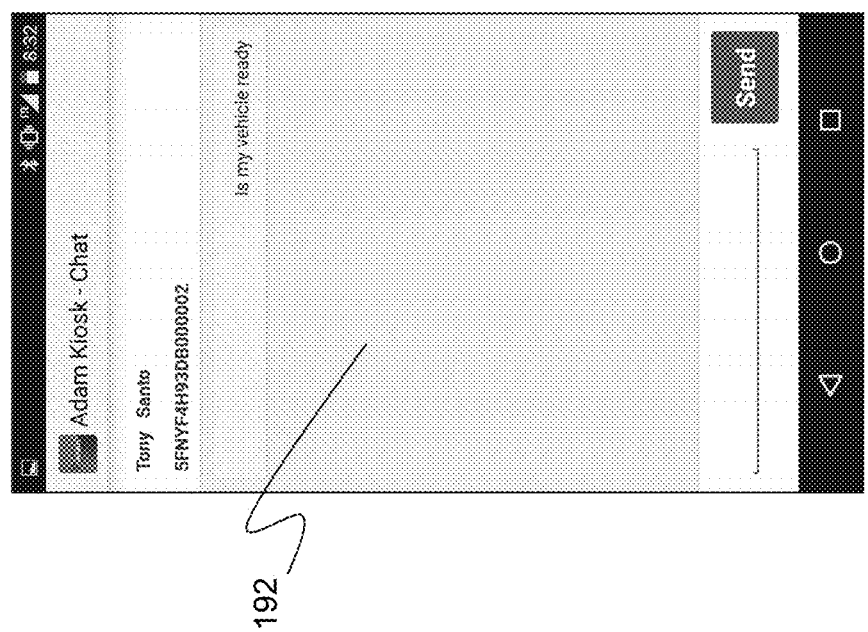
FIG. 13 is an embodiment of a communication/notification screen in an embodiment of the express mobile software application of the present invention.
Figure 15:
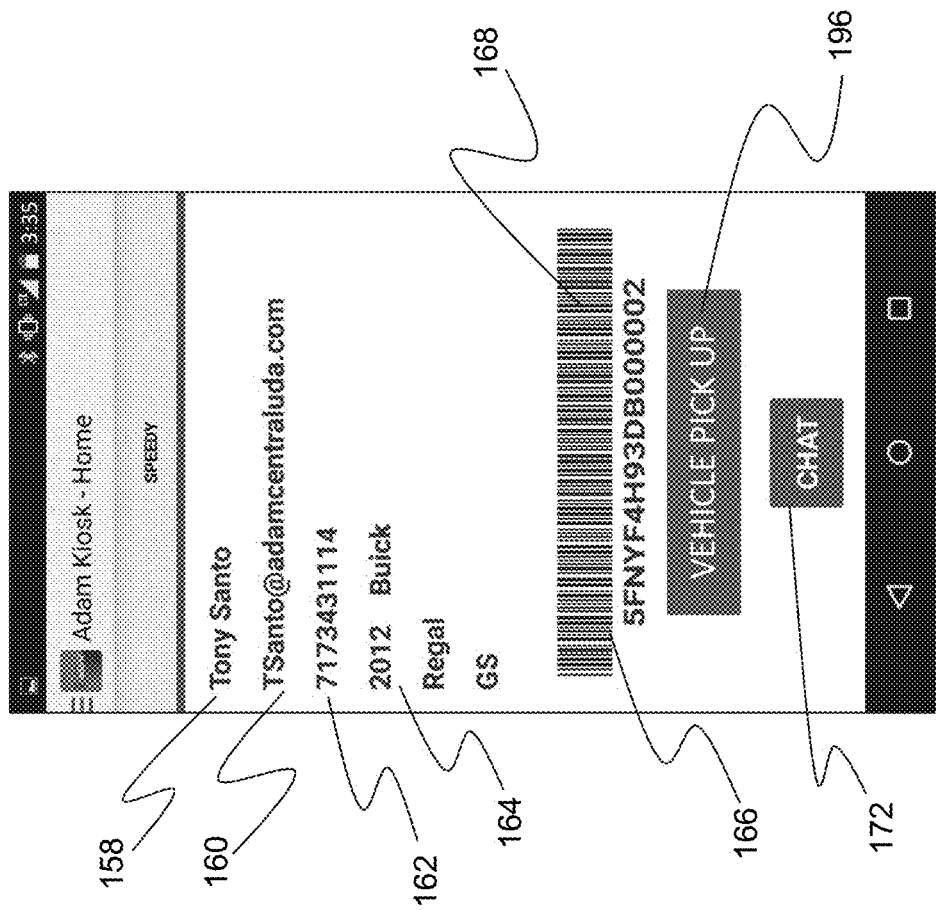
FIG. 15 is an embodiment of a vehicle pickup screen including unique identifier in an embodiment of the express mobile software application of the present invention.
Figure 16:
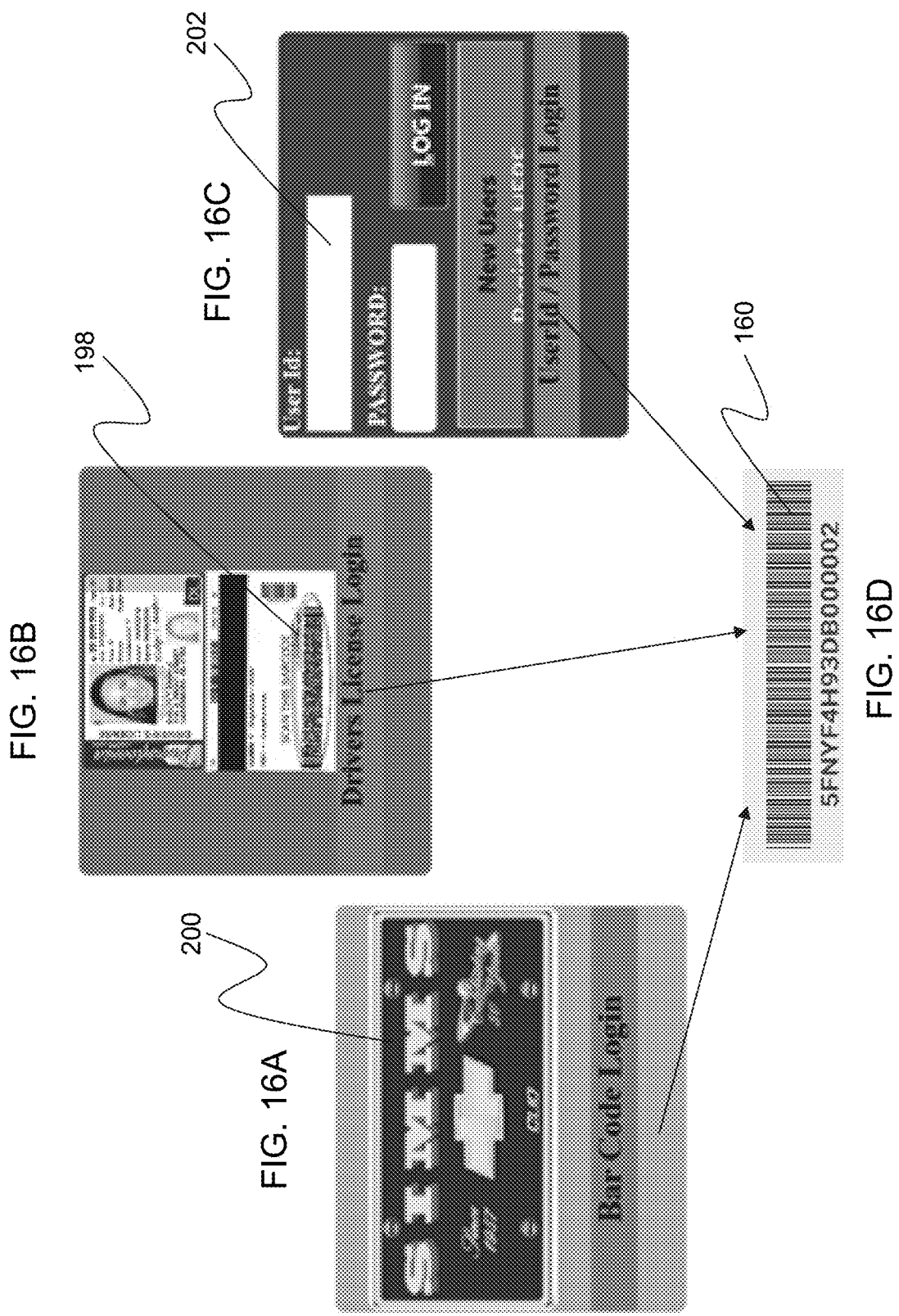
FIGS. 16A-16D are embodiments of source data for the creation of the unique identifier in an embodiment of the express mobile software application of the present invention.

Once the customer information and service item 28 information is registered, the express mobile software application 16 displays the customer name, contact platform information 138 which may be both an email and telephone number for the customer to receive notifications through one or more contact platforms. Vehicle information 164 is also displayed which may include the VIN or only the unique identifier which may be encoded to incorporate both the VIN and information about the customer such as the phone number 162, with the express mobile software application system 20 and express mobile software application 16 providing for translation of the unique identifier 168. The customer may then select a schedule service option button 170 or select a chat option button 172 to speak with the service personnel from the service provider, as shown in FIG. 9. Once the schedule service option button 170 is selected, the express mobile software application 16 provides a service option menu 174 that provides a list of service items 176 that may be based on the age and maintenance requirements of the vehicle, and/or previous history and repairs of the vehicle, as shown in FIG. 10. For specific problems with the vehicle, the express mobile software application 16 provides a problem description dialog box for the customer to enter issues and transmit this information to the service provider using the express mobile software application notification system 17. The express mobile software application 16 may then receive diagnose and repair requirements and suggestions from the service provider in real time and present the service item 176 and cost 178 to the customer, or alternatively, the customer may leave the vehicle and receive the service item menu 174 from the service provider using the notification system 17 after the vehicle has been inspected and any problems have been diagnosed. The customer may then select the desired repairs using the service item check boxes 180. The customer may then select the proceed option 182 and the express mobile software application 16 generates a work order 184, as shown in FIG. 11. The customer is provided with a record of the total cost of repairs 186 and an option to confirm 188. By selecting the confirm option 188 a notification using the notification system 17 is immediately sent to the service provider providing them with the authorization to begin work on the vehicle. A message 190 providing the time for repair is also immediately transmitted to the contact platform 160 of the customer providing for the customer to wait for the repair or leave and return and pick-up the service item 28 at a later time, as shown in FIG. 12. Other features within the express mobile software application 16 provide for the customer to send a status request message 192 using their contact platform 160, as shown in FIG. 13, asking for the status of the repair. A remaining time message 194 providing the remaining time for repair may be immediately transmitted from the service provider to the contact platform 160, as shown in FIG. 14, to allow the customer to adequately plan an appropriate time to retrieve the service item 28. The unique identifier 168 provides for the customer to not have to enter any identifying information, but simply select the vehicle pick-up option 196, as shown in FIG. 15 and provide the unique identifier 168 for display to a scanner or other device to read and translate the unique identifier 168. A scanner or other type of bar code reader may be at the computer system 25 of the kiosk 37 that is near the goods exchange area 22 so that the customer can access the exchange area 22 and retrieve their vehicle even when the service provider is closed.

Figure 17:
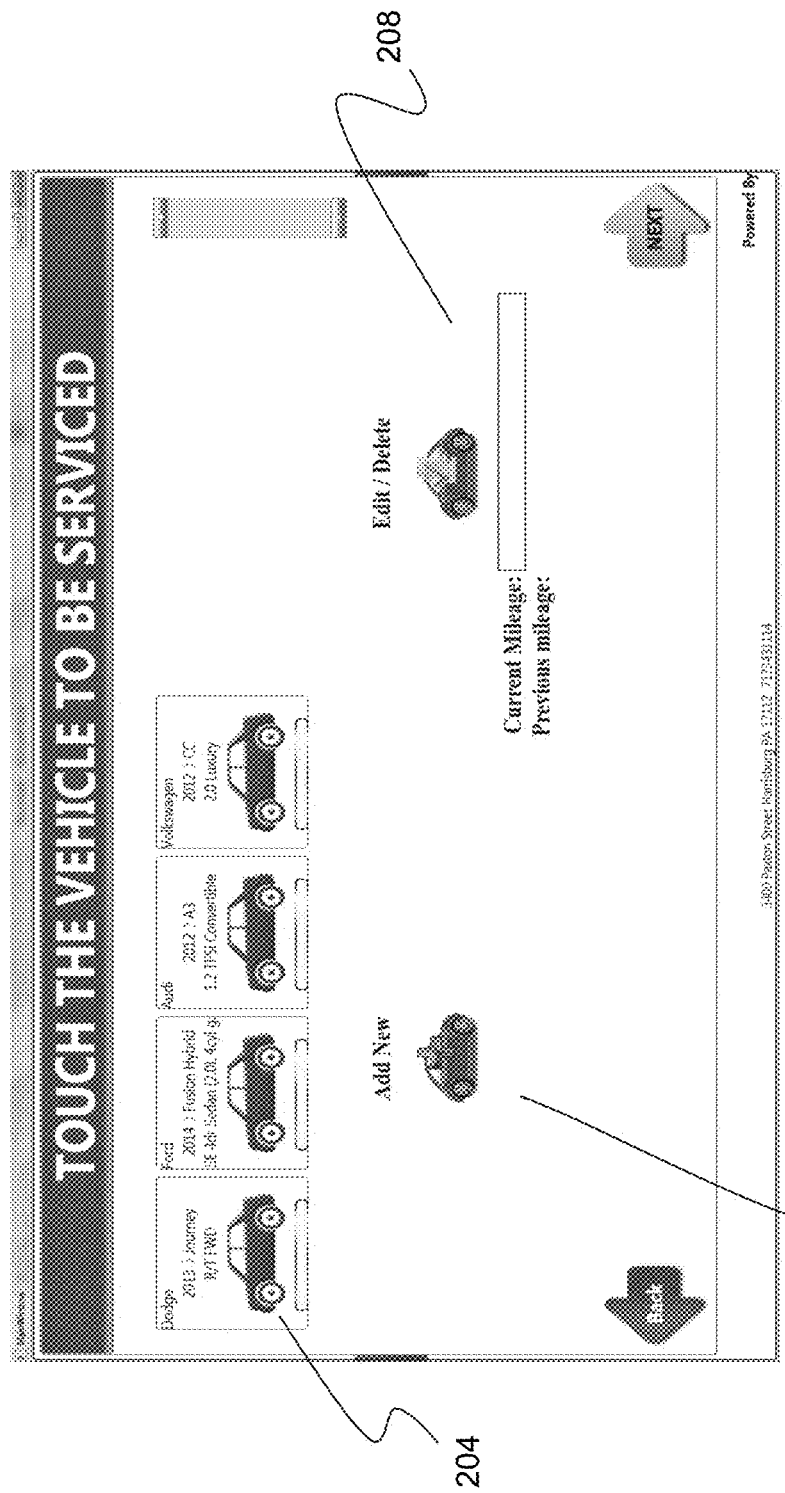
FIG. 17 is an embodiment of a vehicle selection screen in a further embodiment of the express mobile software application of the present invention.
Figure 18:
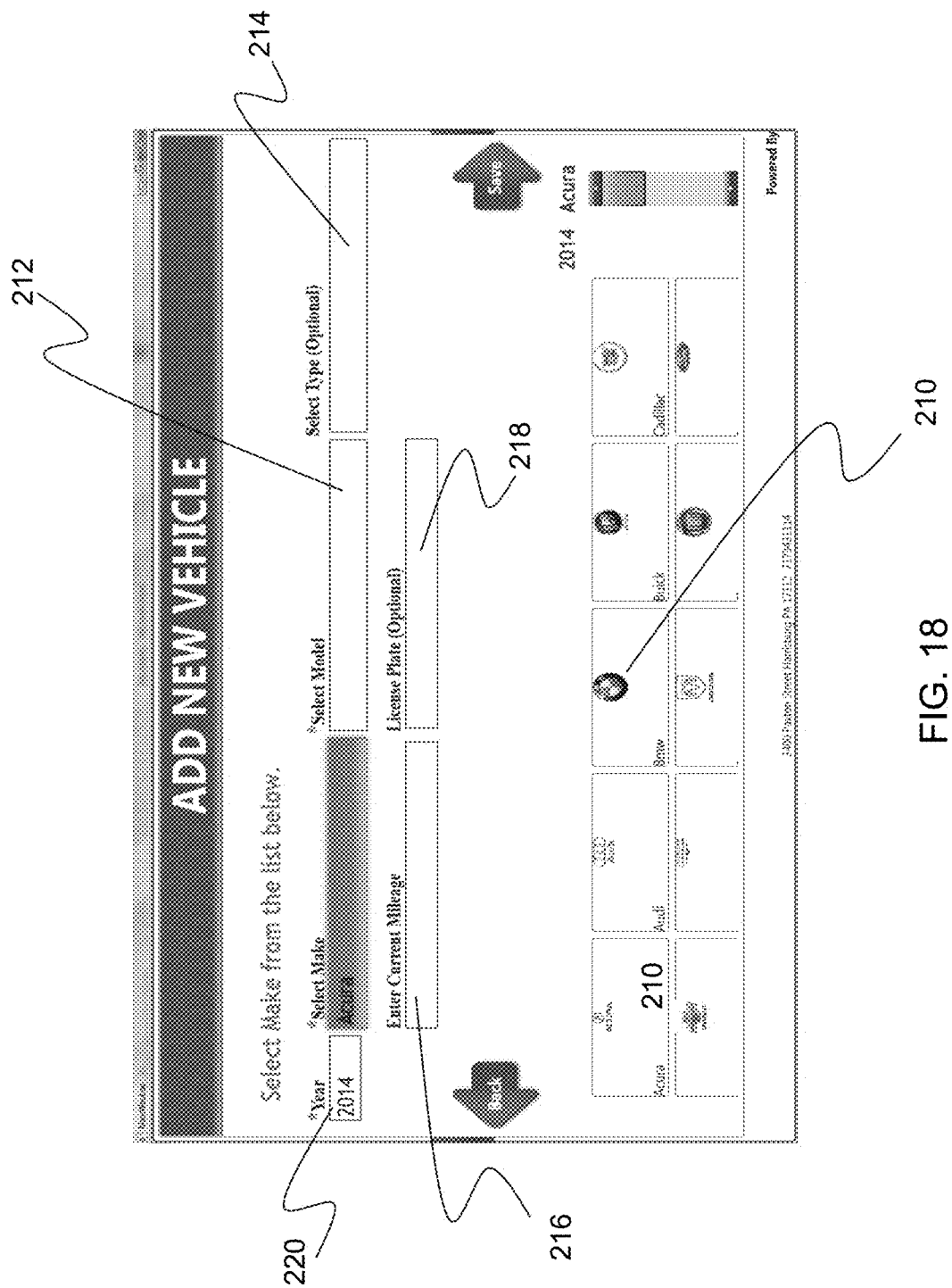
FIG. 18 is an embodiment of an add a vehicle screen in a further embodiment of the express mobile software application of the present invention.
Figure 19:
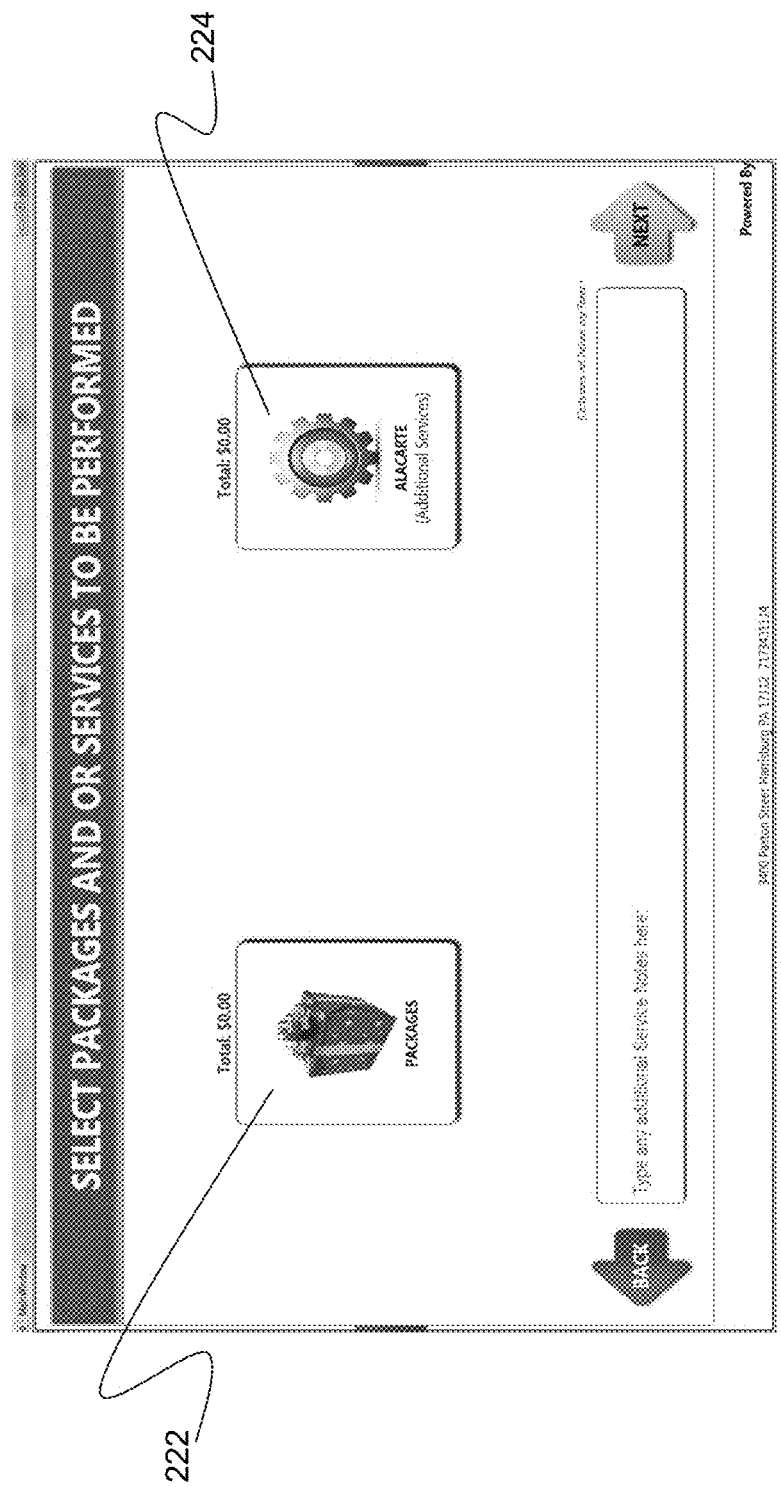
FIG. 19 is an embodiment of a service selection screen including service maintenance packages and ala carte service selection in a further embodiment of the express mobile software application of the present invention.
Figure 20:
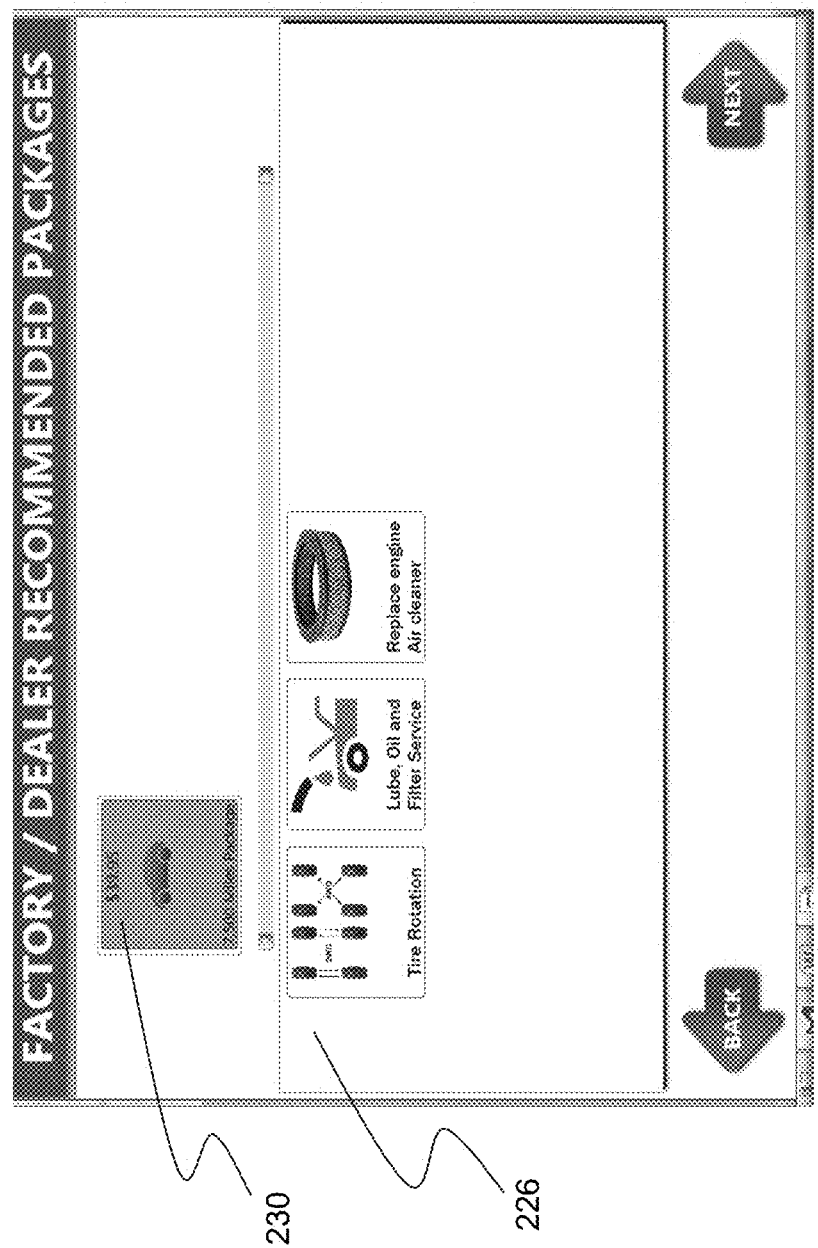
FIG. 20 is an embodiment of a service maintenance package screen in a further embodiment of the express mobile software application of the present invention.
Figure 21:
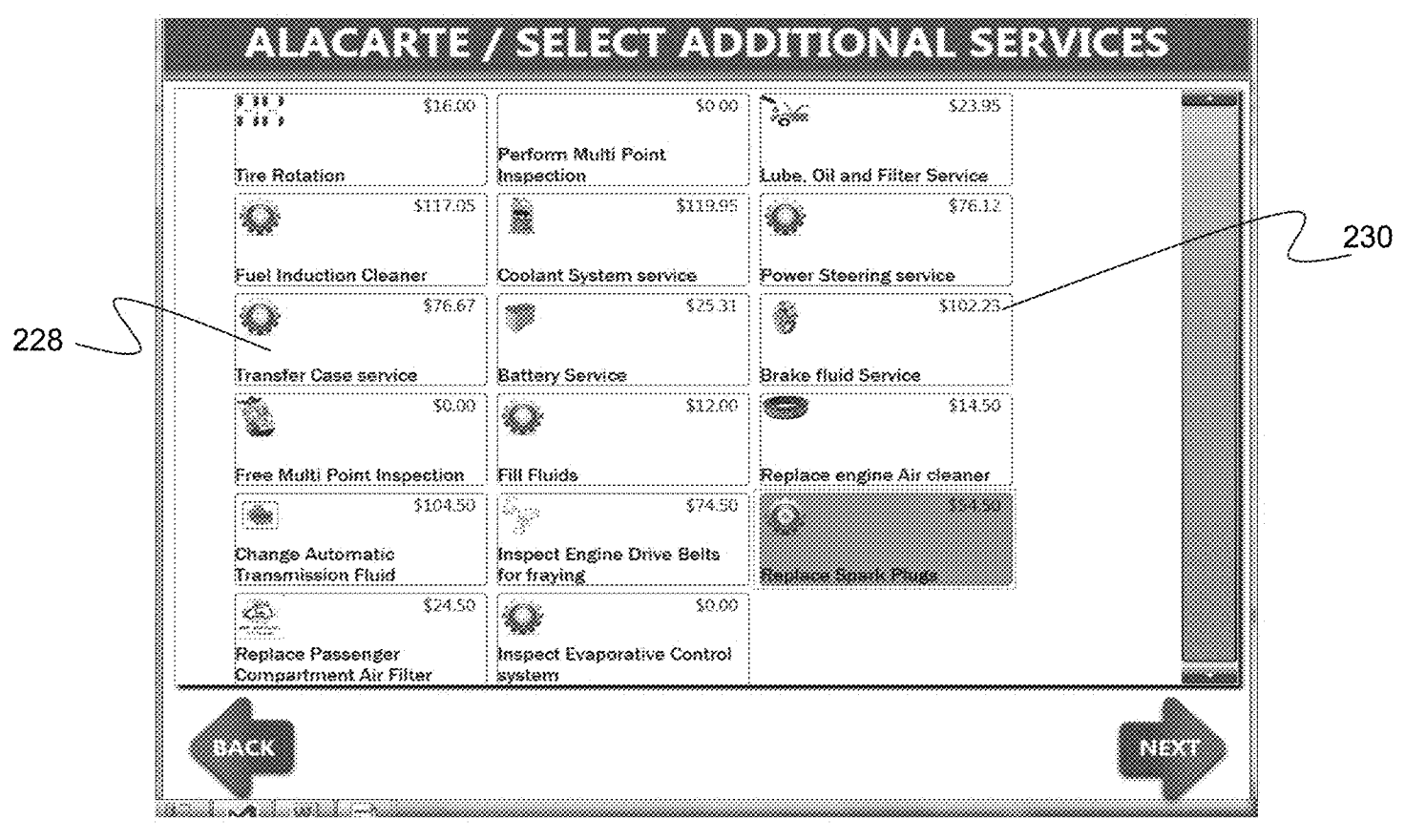
Figure 22:
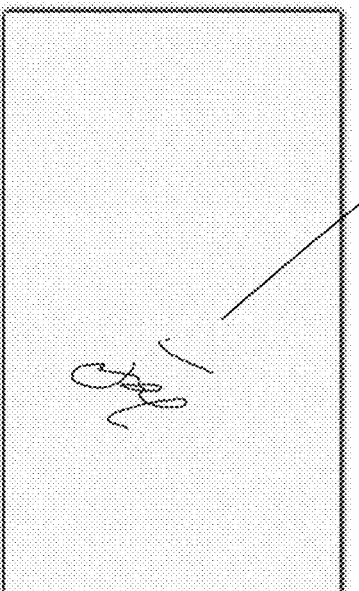
FIG. 22 is an embodiment of a service authorization screen including input for a signature from the customer in a further embodiment of the express mobile software application of the present invention.
Figure 23:
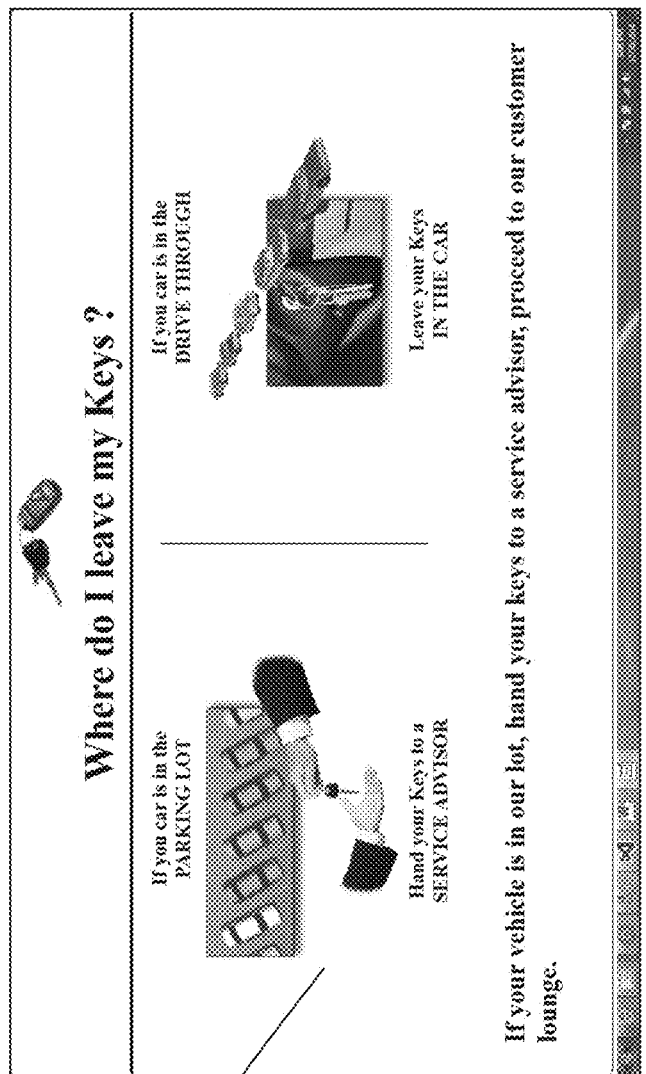
FIG. 23 is an embodiment of a key collection instruction screen with further options for the customer to secure their key in a further embodiment of the express mobile software application of the present invention.

As shown in FIGS. 16A-16D, the unique identifier 168 may be constructed from one or more pieces of information about the customer 198, the service item 200, and/or a unique login and password 202 that the customer provides to prevent unauthorized access and properly identify only the appropriate customer as the owner and/or user of the service item. In further embodiments, as shown in FIG. 17, the customer may have multiple vehicles which may each be optionally selected using vehicle icons 204 with each vehicle having unique identifiers 27 if desired. Options to add a new vehicle 206 and enter vehicle information 208 within the express mobile software application 16 may also be provided. As shown in FIG. 18, graphical icons 210 for options to select the make of the vehicle and dialog boxes to enter the model 212, the type 214, the mileage 216, and license plate number 218, and year 220 may be provided. Options to select maintenance packages 222 and/or select service items ala carte 224 may be provided, as shown in FIG. 19, with the selection of maintenance packages providing specific required maintenance options 226, as shown in FIG. 20 and the selection of ala carte items providing a graphical menu of numerous service items 228 that may be optionally selected as shown in FIG. 21. Pricing 230 of each service item may also be provided within features of the express mobile software application 16 that may access service item inventories and pricing from the data system server 26 of the service provider. In some embodiments, a signature page 232 for the customer to sign for authorization of a work order may be provided as shown in FIG. 22. Instructional pages 236 as shown in FIG. 23 may provide for optional information on how a customer may provide their key to the service provider.

The web-based and mobile express mobile software application system 20 provides unique easily accessible features that facilitate the dropping off and picking up of service items without waiting in line by allowing for items to be immediately dropped off or picked up without interacting with service personnel. The express mobile software application system 20 further provides a unique identifier that secures the service item and prevents access except to a customer that can verify their identification. The express mobile software application system 20 also provides for a customer to review and select items and costs involved with a repair before authorizing service and provides the service provider with the specific requests of the customer reducing costly and misunderstandings. Features of the express mobile software application system 20 provide notification and status to allow a customer to schedule the drop-off and pick-up of a service item at a time that is convenient for them even after the service provider is closed.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A non-transitory computer readable medium having code stored thereon which when executed by a processor performs a method for facilitating the drop-off and pick-up of an item for service without the requirement of interaction between a user and service personnel, comprising:
   accessing from data input from a user the identification of the user;
   accessing from data input from the user or from a service item the identification of the service item and wherein the service item is a vehicle;
   generating a unique identifier from data related to the identification of the user and the identification of the service item;
   an object from the user configured to permit access to the service item, and wherein the user's object is a key configured for access to the vehicle;
   associating the unique identifier with the object thereby permitting access to the object only by using the unique identifier;

a notification interface that communicates to a user, wherein the notification interface communicates to a user specified contact platform;

notifying a service provider that a vehicle has been dropped off;

instructions for the service job to be performed on the vehicle;

grouping and prioritizing similar service jobs by total time required, complexity, current workload, and parts availability to determine cost and time of repair;

communicating to the user using the notification interface the service, the cost, time for repair, completion of service;

wherein the notification interface communicates through the user interface transformed data comprising notification of future appointments; and wherein access to the service item is secure by using the unique identifier to access the user's object that is configured to provide access to the service item without interaction between the user and service personnel.

2. The non-transitory computer readable medium having code stored thereon which when executed by a processor performs the method for facilitating the drop-off and pick-up of an item for service without interaction between a user and service personnel of claim 1 comprising a camera for taking a picture of an alphanumeric string;

converting the alphanumeric string to a unique identifier; and encoding the unique identifier.

3. The non-transitory computer readable medium having code stored thereon which when executed by a processor performs the method for facilitating the drop-off and pick-up of an item for service without interaction between a user and service personnel of claim 2 wherein the alphanumeric string to be used in the creation of the unique identifier is a vehicle identification number.

4. The non-transitory computer readable medium having code stored thereon which when executed by a processor performs the method for facilitating the drop-off and pick-up of an item for service without interaction between a user and service personnel of claim 1 comprising a goods exchange area for receiving the item to be serviced;

a container for receiving the object; and associating the unique identifier with the container and thereby permitting access to the object only by using the unique identifier.

5. The non-transitory computer readable medium having code stored thereon which when executed by a processor performs the method for facilitating the drop-off and pick-up of an item for service without interaction between a user and service personnel of claim 4 wherein the container for receiving the object is a plastic ball.

6. A non-transitory computer readable medium having code stored thereon which when executed by a processor performs a method of automated drop-off and pick-up of a service item without interaction with a service provider comprising the steps of:

implementing a software application executable on a digital device having a processor, memory and data storage, the software application transforming and transmitting data displayable through a user interface to be recognizable to a user;

processing input from a user for the identification of the user;

processing input from the user or a service item for the identification of the service item;

transforming the identification of the user and service item to a unique identifier;

associating the unique identifier with an object of the user, the object configured to permit access to the service item; and implementing a notification interface for communicating with a user specified contact platform;

notifying a service provider that a service item has been dropped off;

instructions for the service job to be performed on the service item;

grouping and prioritizing similar service jobs by total time required, complexity, current workload, and parts availability;

determining the cost and time of repair;

communicating transformed data comprising service, cost, time for repair, completion of service to the item and notification of future appointments wherein access to the software application and to the service item using the unique identifier is secure.

7. The method of automated drop-off and pick-up of a service item without interaction with a service provider of claim 6 comprising converting and encoding a picture of an alphanumeric string to create the unique identifier.

8. The method of automated drop-off and pick-up of a service item without interaction with a service provider of claim 6 comprising converting an alphanumeric string that is a vehicle identification number to create the unique identifier.

9. The method of automated drop-off and pick-up of a service item without interaction with a service provider of claim 6 comprising associating an object with the unique identifier, the object configured to access to the service item.

10. The method of automated drop-off and pick-up of a service item without interaction with a service provider of claim 9 comprising dispensing a container for the object and associating a unique identifier with the object, the container, the service item and the user.

11. The method of automated drop-off and pick-up of a service item without interaction with a service provider of claim 10 comprising forming the container as a plastic ball.

* * * * *